US011206345B2

(12) United States Patent
Ishizu

(10) Patent No.: US 11,206,345 B2
(45) Date of Patent: Dec. 21, 2021

(54) COMMUNICATION APPARATUS, CONTROL METHOD THEREFOR, AND RECORDING MEDIUM THEREFOR

(71) Applicant: CANON KABUSHIKI KAISHA, Tokyo (JP)

(72) Inventor: Akihiko Ishizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 16/721,643

(22) Filed: Dec. 19, 2019

(65) Prior Publication Data

US 2020/0213506 A1 Jul. 2, 2020

(30) Foreign Application Priority Data

Dec. 26, 2018 (JP) ............................ JP2018-242856

(51) Int. Cl.
*H04N 5/232* (2006.01)
*H04L 29/08* (2006.01)

(52) U.S. Cl.
CPC ....... *H04N 5/23206* (2013.01); *H04L 67/025* (2013.01); *H04N 5/23216* (2013.01); *H04N 5/232941* (2018.08)

(58) Field of Classification Search
CPC ......... H04N 5/232941; H04N 5/23216; H04N 5/23206; H04L 67/025
See application file for complete search history.

(56) References Cited

U.S. PATENT DOCUMENTS 7,256,821 B2 * 8/2007 Hata ................. H04L 12/40117 348/207.1
8,392,850 B2 * 3/2013 Nakagawa ......... H04N 1/32117 715/838
8,659,666 B2 * 2/2014 Ishibashi ........... H04N 21/4425 348/207.1
8,977,889 B2 * 3/2015 Angelsmark ......... H04L 41/069 714/6.1
9,325,898 B2 * 4/2016 Torikai ............... H04N 5/23293
9,380,014 B2 * 6/2016 Maeda ............... H04N 21/2747
10,021,287 B2 * 7/2018 Irie .................... H04N 5/23212
10,484,730 B1 * 11/2019 Li .................... H04N 21/44209
(Continued)

FOREIGN PATENT DOCUMENTS

CN 105024820 A * 11/2015
JP 2005-328285 A 11/2005
(Continued)

*Primary Examiner* — John Villecco
(74) *Attorney, Agent, or Firm* — Canon U.S.A., Inc. I.P. Division

(57) ABSTRACT

A communication apparatus includes: an imaging unit configured to generate a live view image; a communication unit; and a control unit, wherein the control unit receives a first request for continuously acquiring the live view images from an external device, via the communication unit, in a case where the imaging unit can generate a live view image, the control unit sends, as a response to the first request, the live view image generated by the imaging unit to the external device via the communication unit, and in a case where the imaging unit cannot generate a live view image, the control unit sends, as a response to the first request, an image for notifying that the imaging unit cannot generate a live view image to the external device.

13 Claims, 19 Drawing Sheets

(56) References Cited

U.S. PATENT DOCUMENTS

| | | | | |
|---|---|---|---|---|
| 2001/0017653 | A1* | 8/2001 | Hata | H04N 21/43632 348/207.99 |
| 2007/0200917 | A1* | 8/2007 | Chen | H04N 1/00244 348/14.01 |
| 2007/0252897 | A1* | 11/2007 | Hata | H04N 21/43632 348/211.3 |
| 2008/0119223 | A1* | 5/2008 | Tsunoda | H04M 1/72409 455/556.1 |
| 2011/0128389 | A1* | 6/2011 | Maeda | H04N 21/6162 348/207.1 |
| 2012/0050551 | A1* | 3/2012 | Ishibashi | H04N 21/43635 348/208.1 |
| 2013/0304916 | A1* | 11/2013 | Hodapp | H04L 67/02 709/224 |
| 2014/0047143 | A1 | 2/2014 | Bateman | |
| 2016/0269575 | A1* | 9/2016 | Maeda | H04N 1/00233 |
| 2017/0171513 | A1* | 6/2017 | Nakamura | H04N 7/152 |
| 2017/0295311 | A1* | 10/2017 | Tokunaga | H04N 1/00281 |
| 2017/0332044 | A1* | 11/2017 | Marlow | H04L 65/1089 |
| 2019/0104561 | A1* | 4/2019 | Fujinaga | H04W 76/14 |
| 2020/0186586 | A1* | 6/2020 | Tokunaga | H04L 67/32 |

FOREIGN PATENT DOCUMENTS

| | | | | |
|---|---|---|---|---|
| JP | 2013-073506 | A | | 4/2013 |
| JP | 2013115551 | A | * | 6/2013 |
| JP | 2017212754 | A | * | 11/2017 |

* cited by examiner

FIG. 4A

| | METHOD | MEANING |
|---|---|---|
| 401 | GET | ACQUIRE CONTENT (IMAGE FILE), ACQUIRE CAMERA INFORMATION AND STATUS, ACQUIRE CAPACITY VALUES AND SET VALUES OF SETTING ITEMS |
| 402 | POST | STORE OBJECT IN CAMERA, PERFORM CAMERA FUNCTION |
| 403 | PUT | CHANGE SET VALUE |
| 404 | DELETE | DELETE CONTENT, DELETE SET VALUES (RETURN TO INITIAL VALUES) |

FIG. 4B

405 http://[IP Address]:[Port NUMBER]/api/ver1

| NAME OF API (URL) | METHOD | EXPLANATION | RESPONSE BODY (JSON) |
|---|---|---|---|
| http://192.168.1.1:8080/api/ver1 | GET | ACQUIRE CORRESPONDING API LIST | { "ver1":[ {"url":"http://192.168.1.1:8080/api/ver1/deviceinfomation", "get": true, "post": false, "put": false, "delete": false}, {"url":"http://192.168.1.1:8080/api/ver1/devicestatus/storage", "get": true, "post": false, "put": false, "delete": false}, ... ... ] } |

| | CATEGORY OF API | EXPLANATION |
|---|---|---|
| 408 | ./deviceinformation | ACQUIRE INDIVIDUAL INFORMATION ON DIGITAL CAMERA |
| 409 | ./devicestatus | ACQUIRE STATUS INFORMATION ON DIGITAL CAMERA |
| 410 | ./functions | ACQUIRE OR CHANGE MENU SETTING<br>EXECUTE MENU FUNCTION |
| 411 | ./shooting/control | EXECUTE IMAGE CAPTURING FUNCTION |
| 412 | ./shooting/settings | ACQUIRE OR CHANGE SHOOTING PARAMETER |
| 413 | ./shooting/liveview | ACQUIRE LIVE IMAGE (LIVE VIEW IMAGE) |
| 414 | ./event | ACQUIRE EVENT INFORMATION FROM DIGITAL CAMERA |
| 415 | ./contents | ACQUIRE CONTENT STORED IN MEDIUM MOUNTED TO DIGITAL CAMERA |

| | NAME OF API (URL) | METHOD | EXPLANATION | EXAMPLE OF REQUEST (JSON) | EXAMPLE OF RESPONSE (JSON) |
|---|---|---|---|---|---|
| 501 | ./shooting/liveview | POST | COMMAND TO SET SIZE OF LIVE IMAGE (REMOTE LIVE VIEW IMAGE) AND START AND FINISH GENERATION OF LIVE IMAGE<br>liveviewsize: SIZE OF LIVE IMAGE<br>cameradisplay: COMMAND CAMERA LCD TO PERFORM DISPLAY | {<br>"liveviewsize":"small",<br>"cameradisplay":"on"<br>} | {} |
| 502 | ./shooting/liveview/flip | GET | ACQUIRE LIVE IMAGE (REMOTE LIVE VIEW IMAGE) | – | LIVE IMAGE DATA (1 FRAME) |
| 503 | ./shooting/liveview/scroll | GET | START ACQUISITION OF LIVE IMAGE (REMOTE LIVE VIEW IMAGE) | – | LIVE IMAGE DATA (chunked DATA)<br>53432<br>LIVE IMAGE DATA<br>56753<br>LIVE IMAGE DATA<br>49675<br>LIVE IMAGE DATA<br>…<br>…<br>… |
| | | DELETE | STOP ACQUISITION OF LIVE IMAGE (REMOTE LIVE VIEW IMAGE) | – | COMMAND TO STOP chunked DATA<br>53432<br>LIVE IMAGE DATA<br>56753<br>LIVE IMAGE DATA<br>49675<br>LIVE IMAGE DATA<br>…<br>…<br>…<br>0 |
| | ⋮ | | | | |

COMMUNICATION APPARATUS, CONTROL METHOD THEREFOR, AND RECORDING MEDIUM THEREFOR

BACKGROUND

Field of the Disclosure

The present disclosure relates to a communication apparatus that can communicate with an external device.

Description of the Related Art

The progress of communication capability of communication apparatuses such as digital cameras and mobile phones has promoted transmission and reception of content between communication apparatuses.

Japanese Patent Laid-Open No. 2013-073506 discloses achievement of remote shooting by a digital camera as a server by using a server-client system such as HTTP.

When a remote control function using an HTTP server-client system is provided for a user, a digital camera to be remotely controlled serves as a server, and the side performing remote control serves as a client. Then, a program for controlling the digital camera is implemented in a client device, and remote control is achieved. It can be considered that a combination of a URL for remotely controlling the digital camera and an executable HTTP method, as a communication application programming interface (API) reduces a burden in implementation of the program on the client. A program achieving the remote control is implemented in the client, which is a counterpart device, based on a disclosed API specification. In order to further reduce the burden in implementation, it can be considered to prepare an API using chunked transfer. However, the chunked transfer is a sending method of repeatedly sending an HTTP response body after returning an HTTP response header. Thus, when data to be sent cannot be prepared during sending of the HTTP response body, it is impossible for the digital camera to provide notification of an error with the HTTP response header. On the other hand, when error information is included in the HTTP response body in order to provide notification of an error, processing for analyzing the error information is required in the counterpart device, and a burden in implementation increases due to development of the counterpart application program.

SUMMARY

A communication apparatus includes: an imaging unit configured to generate a live view image; a communication unit; and a control unit, wherein the control unit receives a first request for continuously acquiring the live view images from an external device, via the communication unit, in a case where the imaging unit can generate a live view image, the control unit sends, as a response to the first request, the live view image generated by the imaging unit to the external device via the communication unit, and in a case where the imaging unit cannot generate a live view image, the control unit sends, as a response to the first request, an image for notifying that the imaging unit cannot generate a live view image to the external device.

Further features of the present disclosure will become apparent from the following description of exemplary embodiments (with reference to the attached drawings).

BRIEF DESCRIPTION OF THE DRAWINGS

FIGS. 4A to 4C are tables illustrating basic configurations of a communication API according to the first exemplary embodiment.

FIG. 5 is a table illustrating an API according to the first exemplary embodiment for acquiring a live image of the digital camera;

DESCRIPTION OF THE EMBODIMENTS

Hereinafter, exemplary embodiments of the present disclosure will be described in detail with reference to the accompanying drawings. The exemplary embodiments described below are by way of example as means for realizing the present disclosure, and may be appropriately modified or changed depending on the configuration of an apparatus to which the present disclosure is applied and various conditions. Moreover, it is also possible to combine exemplary embodiments suitably.

First Exemplary Embodiment

<Configuration of Digital Camera 100>

Figure 1A:
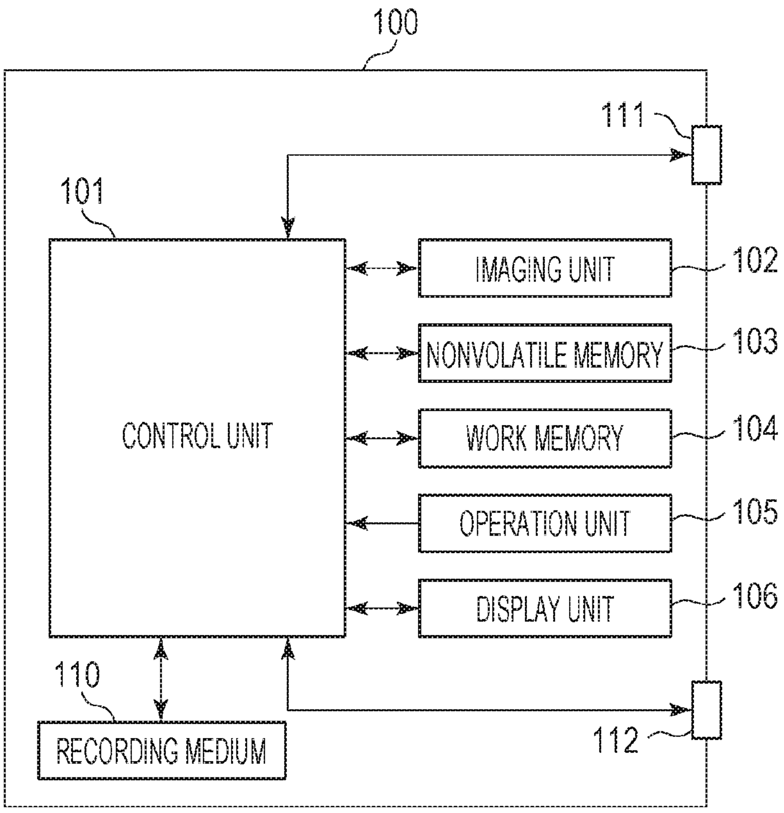
FIGS. 1A to 1C are diagrams illustrating a block configuration, a front side, and a back side of a digital camera according to a first exemplary embodiment.

FIG. 1A is a block diagram illustrating a configuration example of a digital camera 100 being an example of a communication apparatus to which the present exemplary embodiment is applied. Note that although the digital camera will be described here as an example of the communication apparatus, the communication apparatus is not limited to the digital camera. For example, the communication apparatus may be an information processing apparatus, such as a portable media player, a so-called tablet device, or a personal computer.

A control unit 101 controls each unit of the digital camera 100 according to an input signal and a program, which is described later. Note that instead of controlling the entire apparatus by the control unit 101, the entire apparatus may be controlled by a plurality of pieces of hardware so that processing is divided therebetween.

An imaging unit 102 includes, for example, an optical system for controlling an optical lens unit and aperture, zoom, focus, or the like, and an imaging element for converting light (video image) introduced through the optical lens unit into an electrical video signal. In general, a complementary metal oxide semiconductor (CMOS) or a charge coupled device (CCD) is used as the imaging element. The imaging unit 102 is controlled by the control unit 101 to convert subject light focused by a lens included in the imaging unit 102 into an electrical signal with the imaging element, perform noise reduction processing or the like, and output digital data as image data. In the digital camera 100 according to the present exemplary embodiment, image data is encoded by the control unit 101 and recorded as a file on a recording medium 110 according to a design rule for camera file system (DCF) standard.

A nonvolatile memory 103 is an electrically erasable/recordable nonvolatile memory, and stores, for example, a program, which is described later, executed by the control unit 101. A work memory 104 is used as a buffer memory for temporarily holding image data captured by the imaging unit 102, an image display memory for a display unit 106, a work area for the control unit 101, and the like.

An operation unit 105 is used for receiving an instruction to the digital camera 100 from the user. The operation unit 105 includes, for example, a power button for the user to command on/off the power of the digital camera 100, a release switch to give a command to capture an image, and a playback button to give a command to reproduce image data. Furthermore, the operation unit 105 includes an operation member such as a connection button dedicated for starting communication with an external device via a communication unit 111, which is described later. Still furthermore, the operation unit 105 also includes a touch panel formed on the display unit 106, which is described later. The release switch includes SW1 and SW2 for detecting a pressed state in two stages. When the release switch is pressed halfway into a so-called half-stroke state, SW1 is turned on. In this state, an instruction is received to prepare for shooting, such as autofocus (AF) processing, automatic exposure (AE) processing, automatic white balance (AWB) processing, or pre-flash (EF) processing. Furthermore, when the release switch is pressed fully into a so-called full-depression state, SW2 is turned on. Thus, an instruction for capturing an image is received.

The display unit 106 displays a viewfinder image upon capturing an image, captured image data, and characters for interactive operation. Note that the display unit 106 is not necessarily built in the digital camera 100. Preferably, the digital camera 100 is connectable to an internal or external display unit 106 and has at least a display control function for controlling display of the display unit 106. Note that the operation unit 105 and the display unit 106 constitute a user interface of the digital camera.

The recording medium 110 is configured to record a file of image data output from the imaging unit 102. The recording medium 110 may be configured to be detachable from the digital camera 100 or may be built in the digital camera 100. In other words, the digital camera 100 preferably at least includes a unit for accessing the recording medium 110.

The communication unit 111 is an interface for connection to an external device. The digital camera 100 according to the present exemplary embodiment is configured to exchange data with an external device via the communication unit 111. For example, image data generated by the imaging unit 102 can be sent to an external device via the communication unit 111. Note that in the present exemplary embodiment, the communication unit 111 includes an interface for communication over a so-called wireless LAN according to IEEE 802.11. The control unit 101 controls the communication unit 111 to achieve wireless communication with an external device. Note that the communication method is not limited to the wireless LAN and may include a wireless communication method, such as an infrared communication method, a Bluetooth (registered trademark) communication method, or Wireless USB. Furthermore, a wired connection, such as a USB cable, HDMI (registered trademark), IEEE1394, or Ethernet, may be employed.

A near field communication unit 112 includes, for example, an antenna for wireless communication, a modulation/demodulation circuit for processing a radio signal, and a communication controller. The near field communication unit 112 outputs a modulated radio signal from the antenna and demodulates a radio signal received by the antenna to achieve short range communication according to the ISO/IEC 18092 (so-called NFC: Near Field Communication). In addition, short-range wireless communication is achieved according to an infrared communication method, a Bluetooth (registered trademark) communication method, a wireless communication method such as Wireless USB, or the like. The near field communication unit 112 according to the present exemplary embodiment is disposed on a side portion of the digital camera 100.

In the present exemplary embodiment, when communication is started from the communication unit, the digital camera 100 is connected to a smart device 200, which is described later. In addition, the communication unit 111 of the digital camera 100 according to the present exemplary embodiment has an AP mode in which the digital camera 100 operates as an access point in an infrastructure mode, and a CL mode in which the digital camera 100 operates as a client in the infrastructure mode. Thus, operation of the communication unit 111 in the CL mode enables operation of the digital camera 100 according to the present exemplary embodiment as a CL device in the infrastructure mode. In a case where the digital camera 100 operates as the CL device, connection of the digital camera 100 to a peripheral AP device enables participation in a network formed by the AP device. In addition, operation of the communication unit 111 in the AP mode enables operation of the digital camera 100 according to the present exemplary embodiment as a simplified AP (hereinafter also referred to as a simple AP), a kind of AP, with further limited functions. When the digital camera 100 operates as the simple AP, the digital camera 100 forms a network by itself. Devices around the digital camera 100 can recognize the digital camera 100 as an AP device and participate in the network formed by the digital camera 100. A program for operating the digital camera 100 as described above is held in the nonvolatile memory 103, and the AP mode or the CL mode is selected by the user's operation of the operation unit 105.

The digital camera 100 according to the present exemplary embodiment is a kind of AP but is a simple AP with no gateway function for transferring data received from a CL device to an Internet provider or the like. Therefore, even if the digital camera 100 receives data from another device participating in the network formed by the digital camera 100, the data cannot be transferred to a network such as the Internet.

Figure 1B:
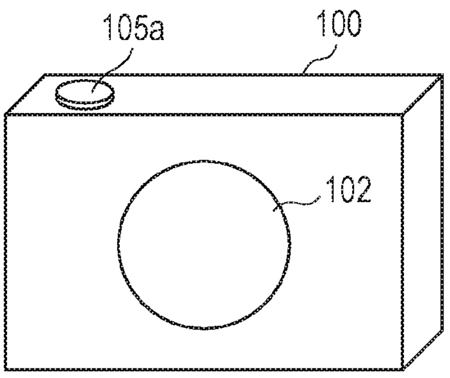
Figure 1C:
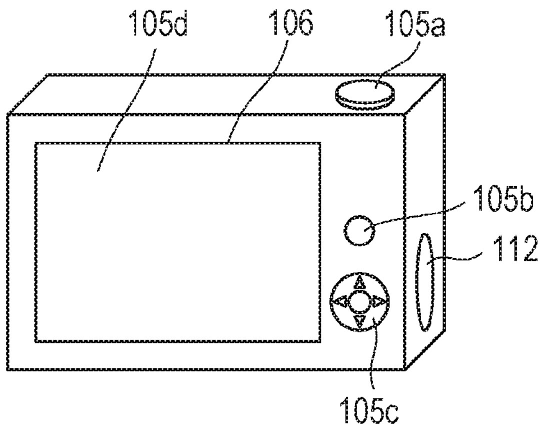

Next, the appearance of the digital camera 100 will be described. FIGS. 1B and 1C are diagrams illustrating an example of the appearance of the front and back sides of the digital camera 100. A release switch 105*a*, a playback button 105*b*, a cursor key 105*c*, and a touch panel 105*d* are operation members included in the operation unit 105 described above. In addition, the display unit 106 displays an image obtained as a result of image capturing by the imaging unit 102 thereon.

<Internal Configuration of Smart Device 200>

Figure 2:
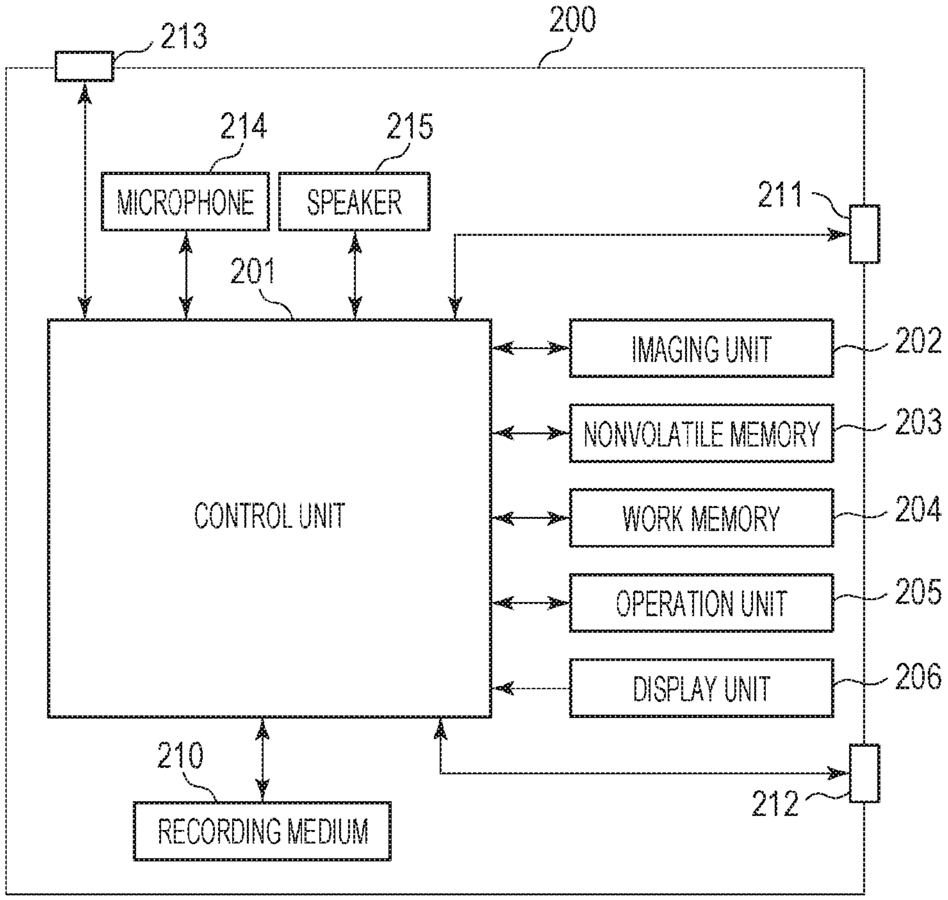
FIG. 2 is a block diagram illustrating a configuration of a smart device according to the first exemplary embodiment.

FIG. 2 is a block diagram illustrating a configuration example of the smart device 200 being an example of an information processing apparatus that communicates with the digital camera 100 according to the present exemplary embodiment. Note that the smart device means a mobile terminal such as a smartphone or a tablet device. Furthermore, although the smart device is described here as an example of the information processing apparatus, the information processing apparatus is not limited to the smart device. For example, the information processing apparatus may be a digital camera with wireless communication function, printer, television set, personal computer, or the like.

A control unit 201 controls each unit of the smart device 200 according to an input signal and a program, which is described later. Note that instead of controlling the entire apparatus by the control unit 201, the entire apparatus may be controlled by a plurality of pieces of hardware so that processing is divided therebetween.

An imaging unit 202 converts subject light focused by a lens included in the imaging unit 202 into an electrical signal, performs noise reduction processing or the like, and outputs digital data as image data. Captured image data is stored in a buffer memory, subjected to predetermined calculation and encoding processing by the control unit 201, and recorded as a file on a recording medium 210.

A nonvolatile memory 203 is an electrically erasable/recordable nonvolatile memory. The nonvolatile memory 203 records an OS (operating system) that is basic software executed by the control unit 201 and an application that achieves an applied function in cooperation with the OS. Furthermore, in the present exemplary embodiment, the nonvolatile memory 203 stores an application for communicating with the digital camera 100.

A work memory 204 is used as an image display memory for a display unit 206, a work area for the control unit 201, and the like. An operation unit 205 is used for receiving an instruction to the smart device 200 from a user. The operation unit 205 includes, for example, a power button for the user to command on/off the power of the smart device 200 and an operation member such as a touch panel formed on the display unit 206. The display unit 206 displays image data, characters for interactive operation, and the like. Note that the display unit 206 is not necessarily included in the smart device 200. Preferably, the smart device 200 is connectable to the display unit 206 and has at least a display control function for controlling display of the display unit 206. Note that the operation unit 205 and the display unit 206 constitute a user interface of the smart device 200.

The recording medium 210 is configured to record image data output from the imaging unit 202. The recording medium 210 may be configured to be detachable from the smart device 200 or may be built in the smart device 200. In other words, the smart device 200 preferably at least includes a unit for accessing the recording medium 210.

A communication unit 211 is an interface for connection to an external device. The smart device 200 according to the present exemplary embodiment is configured to exchange data with the digital camera 100 via the communication unit 211. In the present exemplary embodiment, the communication unit 211 is an antenna, and the control unit 101 is connectable to the digital camera 100 via the antenna. Note that a connection with the digital camera 100 may be made directly or may be made via an access point. The protocol for communicating data is, for example, HTTP (Hyper Text Transfer Protocol). In addition, Picture Transfer Protocol over Internet Protocol (PTP/IP) via a wireless LAN can be used. Note that communication with the digital camera 100 is not limited to this. For example, the communication unit 211 may include a wireless communication module, such as an infrared communication module, a Bluetooth (registered trademark) communication module, or Wireless USB. Furthermore, a wired connection, such as a USB cable, HDMI, IEEE1394, or Ethernet, may be employed.

A near field radio communication unit 212 is a communication unit for achieving non-contact short-range communication with another device. The near field radio communication unit 212 includes, for example, an antenna for wireless communication, a modulation/demodulation circuit for processing a radio signal, and a communication controller. The near field radio communication unit 212 outputs a modulated radio signal from the antenna and demodulates a radio signal received by the antenna to achieve non-contact short-range communication. Here, contactless communication according to ISO/IEC 18092 standard (so-called NFC) is achieved. Upon receiving a data read request from another device, the near field radio communication unit 212 outputs response data based on data stored in the nonvolatile memory 203.

A public network communication unit 213 is an interface used in public wireless communication. The smart device 200 is configured to make a call to another device via the public network communication unit 213. At this time, the control unit 201 inputs and outputs an audio signal via a microphone 214 and a speaker 215, thereby achieving a call. In the present exemplary embodiment, the public network communication unit 213 is an antenna, and the control unit 101 is connectable to a public network via the antenna. Note that the communication unit 211 and the public network communication unit 213 can share a single antenna.

<System Configuration>

Figure 3:
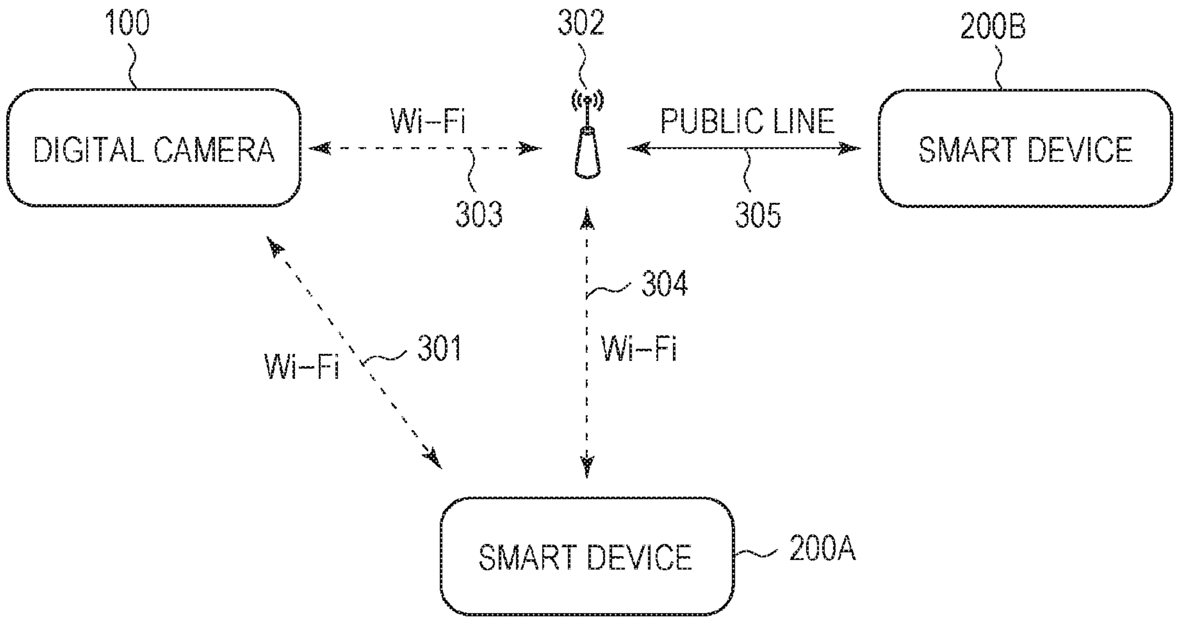
FIG. 3 is a block diagram illustrating a system configuration according to the first exemplary embodiment.

FIG. 3 is a diagram illustrating a system configuration for the smart device 200 to control the digital camera 100 by using a communication API of the digital camera 100 through a network.

Three types of system configurations are provided to control the digital camera 100 by using the communication API.

Firstly, as shown in communication 301, a peer-to-peer connection is established between the digital camera 100 and the smart device 200A. At this time, the digital camera 100 serves as a Wi-Fi access point and establishes a local area network (LAN). The smart device 200A functions as a Wi-Fi client and joins the LAN established by the digital camera 100. In the present embodiment, communication 301 via Wi-Fi is described as an example, but a wired connection such as Ethernet may be used.

Next, as shown in a network router 302 and communications 303 and 304, the digital camera 100 and the smart device 200A are connected via the network router 302. At this time, the network router serves as a Wi-Fi access point and establishes a LAN. The digital camera 100 and the smart device 200A serve as Wi-Fi clients and join the LAN established by the network router 302. Note that in the present embodiment, the communications 303 and 304 via Wi-Fi are described as an example, but a wired connection such as Ethernet may be used.

Finally, as shown in the network router 302, the communication 303, and a public line 305, a smart device 200B is connected to the digital camera 100 via the public line 305. In the two system configurations described above, each connection is established in the same LAN. On the other hand, in this configuration, use of, for example, a virtual private network (VPN) enables the smart device 200B to communicate with the digital camera 100 from a remote location outside the LAN through the Internet. Note that the VPN is a well-known technology and description thereof is omitted here.

In the above three types of system configurations described above, the smart devices 200 can use the communication API of the digital camera 100.

<Basic Configuration of Communication API Disclosed by Digital Camera 100>

FIGS. 4A to 5 are diagrams illustrating a configuration of the communication API for controlling the digital camera 100 from an external device such as the smart device 200.

The digital camera 100 discloses the communication API for controlling the digital camera 100 from an external device such as the smart device 200. This API is used to receive a request, and thus, the digital camera 100 according to the present exemplary embodiment sends device information recorded in the nonvolatile memory 103 or a content file stored in the recording medium 110 or the like to the external device via the communication unit 111. The content file is an image file generated by the digital camera 100 and stored in the recording medium 110 or the nonvolatile memory 103. In the present exemplary embodiment, the content file indicates a captured still image file or moving image file.

A program corresponding to the communication API is stored in the nonvolatile memory 103 in advance. When a communication with the external device is established via the communication unit 111, the control unit 101 deploys a program corresponding to the communication API in the work memory 104 and waits for a request using the communication API from the external device. When detecting a request using the communication API from the external device, the control unit 101 executes processing according to the type of the communication API and returns a result, as a response, to the external device. The program corresponding to the communication API is executed using a communication protocol defined by the digital camera 100, and the external device communicates with the digital camera 100 over the defined communication protocol and makes a request by using the communication API. In the present exemplary embodiment, a program corresponding to this communication API is executed over Hyper Text Transfer Protocol (HTTP). In other words, the digital camera 100 functions as an HTTP server. In other words, in the present exemplary embodiment, the communication API which is implemented as WebAPI will be described as an example.

Note that the communication protocol is not limited to HTTP and may be another protocol. In addition, the HTTP protocol itself is widely used, and the description thereof will be omitted here.

Execution of the program corresponding to the communication API in the HTTP is achieved by the following procedure.

Firstly, to a URL disclosed as the communication API, the external device describes necessary instruction information according to a specification of the communication API as an access destination into text data, in an HTTP request body. Then, the data is sent to the digital camera 100 using an HTTP method, that is, any one of four methods of GET (acquisition), POST (generation), PUT (update), and DELETE (deletion).

The digital camera 100 receiving the data performs processing based on the URL, HTTP method, and the contents of the instruction information of the HTTP request body, adds a result of the processing to an HTTP response body together with an HTTP response header, and returns the result to the external device. The execution of program is achieved by the above procedure. Note that the HTTP response header includes an HTTP status code.

In the communication API, data described in the HTTP request body and the HTTP response body is expressed in JavaScript (registered trademark) Object Notation (JSON) which is one of data description languages. Each communication API has a JSON syntax specification corresponding to each function, and the digital camera 100 and the smart device 200 analyze a request instruction or a response according to the JSON syntax specification.

Note that although the JSON is used in the present embodiment, Extensible Markup Language (XML) may be used or text data or binary data defined by an original format may be used.

Next, the configuration of the communication API will be described in detail.

In the following description, for ease of description, not only an interface itself but also a service corresponding to a communication API and a program for achieving the service are also simply referred to as the API or communication API. In other words, executing a program achieving a service corresponding to an API is described as executing an API, and requesting performance of a corresponding service via an API is described as requesting an API.

FIGS. 4A to 4C are tables illustrating the basic configuration of the communication API.

Firstly, the HTTP method used for the communication API in the present exemplary embodiment will be described. In the present exemplary embodiment, for the communication API, only four types of HTTP methods are used, namely, GET 401, POST 402, PUT 403, and DELETE 404. The HTTP standard has other methods but methods are limited to these permanent four basic functions, such as acquisition, generation, update, and deletion, which almost computer software has. Note that the meanings of the four methods in this communication API are as follows.

GET 401 is used for acquiring content (image file), acquiring camera information or a status, and acquiring a capacity value or set value of a setting item.

POST 402 is used for executing camera functions, for example, storing data such as a content file, capturing an image, and zooming, in the digital camera 100 from the external device.

PUT 403 is used for changing a set value, such as menu setting and shooting parameter setting, of the digital camera 100.

DELETE 404 is used for deleting content or initializing setting values.

By narrowing down to the above four methods, control for complex HTTP method is not required. Therefore, a programmer who creates a control program for the smart device 200 for controlling the digital camera 100 can create a program only by using the minimum HTTP methods which are used frequently.

Next, a top URL of the communication API in the present exemplary embodiment will be described. The top URL is a URL defined as a URL which the client accesses first when controlling the digital camera 100. The controller needs to access this top URL before using another API for remotely controlling the camera.

In FIGS. 4A to 4C, a URL 405 represents the top URL of the communication API. The host name and domain name of the top URL are composed of an IP address and a port number assigned to the digital camera 100. Subsequently, a directory indicating the communication API and a directory indicating the version of the communication API follow. For example, when an IP address assigned to the digital camera 100 is 192.168.1.1 and a port number is 8080, the top URL is expressed as follows: http://192.168.1.1:8080/api/ver1.

When the smart device 200, which is an HTTP client, requests the top URL of the communication API disclosed by the digital camera 100, which is the HTTP server, by using GET 401, the digital camera 100 returns a response body (JSON) indicated in an API 406. Here, a list of communication APIs supported by the digital camera 100 is shown. Note that it is characterized that the JSON syntax shows which HTTP method corresponds to which URL. Access to the top URL enables the smart device 200 to know the types of the communication APIs supported by the digital camera 100.

Next, an API table 407 shows the categories of the communication API. The communication API according to the present exemplary embodiment indicates that URLs are classified into a plurality of categories according to the type of function. Note that in the URL donation of each API category in the table, the top URL is omitted. In fact, an API category 408 shows the following URL: http://192.168.1.1:8080/api/ver1/deviceinformation.

Next, categorization of the communication API functions will be described. Firstly, the API category 408 is a category for acquiring individual information on the digital camera 100. Next, an API category 409 is a category for acquiring status information on the digital camera 100. Next, an API category 410 is a category for acquiring or changing menu setting of the digital camera 100, and executing a menu function. Next, an API category 411 is a category for executing an image capturing function of the digital camera 100. Next, an API category 412 is a category for acquiring or changing shooting parameter setting of the digital camera 100. Next, an API category 413 is a category for acquiring a live image output by the digital camera 100. Next, an API category 414 is a category for acquiring event information issued by the digital camera 100. Next, an API category 415 is a category for acquiring content stored in a medium mounted to the digital camera 100.

As described above, the communication API functions are categorized based on the URL, and thus, characteristically, it is obvious to the programmer who creates a control program for the smart device 200 for controlling the digital camera 100 that a communication API which the programmer desires to execute is at which URL.

Note that individual communication APIs have a URL defined in a directory shown below the API category described above.

This is the end of the description of the basic configuration of the API.

Next, a characteristic API for acquiring a live image captured by the digital camera 100 will be described according to the present exemplary embodiment.

<API for Acquiring Live Image Captured by Digital Camera 100>

An API table 500 in FIG. 5 is a table showing an API group for acquiring a live image (live view image) captured by the digital camera 100 and displays APIs belonging to the API category 413 in FIGS. 4A to 4C.

An API 501 is an API that instructs the digital camera 100 to start and finish generation of the live image. When instructions on the size of a live image and whether to display the live image on the display unit 106 of the digital camera 100 are described in a request body to execute this API by using POST 402, the digital camera 100 starts or finishes the generation of the live image according to the contents of the instructions.

API 502 is an API for acquiring one frame of a live image captured by the digital camera 100. When this API is executed by using GET 401, one frame of the live image set through API 501 can be acquired.

API 503 is an API for acquiring a live image captured by the digital camera 100 by chunked transfer. The chunked transfer is one of data transfer mechanisms defined in HTTP1.1 (RFC2616). The chunked transfer is a sending method in which even if the size of total response data is previously unknown, a size of each data block is written and a response is returned. API 503 is more effective than API 502, for example, when the capacity of total data is unknown or when data is continuously acquired. The mechanism is a well-known technique, and detailed description thereof will be omitted here. When this API is executed by using GET 401, the live image is continuously sent in order of live image size information and actual live image data, as shown in the API table 500. In the present exemplary embodiment, it is assumed that the live image is sent frame by frame to the smart device 200. When this API is executed by using DELETE 404, the digital camera 100 sends the size information of the live image as 0, as shown in the last row of the API table 500, and stops the chunked transfer of the live image.

Here, a case where a live image cannot be generated due to an error occurring in the digital camera 100 will be described. When the counterpart device executes API 502 on the digital camera 100, the digital camera 100 sends one frame of the live image as a response to the request. Therefore, for example, when an error occurs in the digital camera 100 during live view, the digital camera 100 is configured to store information indicating the error in the HTTP response header to provide notification of the error to the counterpart device. Furthermore, the HTTP standard defines a code for indicating an error, in the HTTP response header. Still furthermore, the HTTP response header is always referred to in HTTP communication. Thus, the smart device 200 can determine whether an error occurs in the digital camera 100 by referring to the HTTP response header without requiring any special algorithm.

On the other hand, when the counterpart device executes API 503 on the digital camera 100, the digital camera 100 continuously sends the live image as an HTTP response body, responding to the request, after sending the HTTP response header. In the chunked transfer method, the digital camera 100 cannot send an HTTP response header during sending the live image. Therefore, even if an error occurs in the digital camera 100 during live view, the digital camera 100 cannot provide notification of the content of the error using the HTTP response header. Furthermore, as a solution, there is a method in which a data region for including the content of the error is created in the HTTP response body or a data structure of the live image and the counterpart device analyzes the data region. However, with this method, the counterpart device needs to analyze the HTTP response body or the live image. Thus, the method of analyzing the HTTP response body (live image) in the counterpart device increases a burden in implementation for development of a counterpart application.

In the present exemplary embodiment, even in the chunked transfer method, the smart device 200 as the counterpart device notifies the user of the counterpart device that the digital camera 100 cannot generate a live image, without analyzing an HTTP response body or the live image. Therefore, in a case where the digital camera 100 cannot generate a live image, a dummy image is sent in the chunked transfer according to the present exemplary embodiment.

DESCRIPTION OF METHOD OF ACQUIRING LIVE IMAGE FRAME BY FRAME IN PRESENT EXEMPLARY EMBODIMENT

Figure 6A:
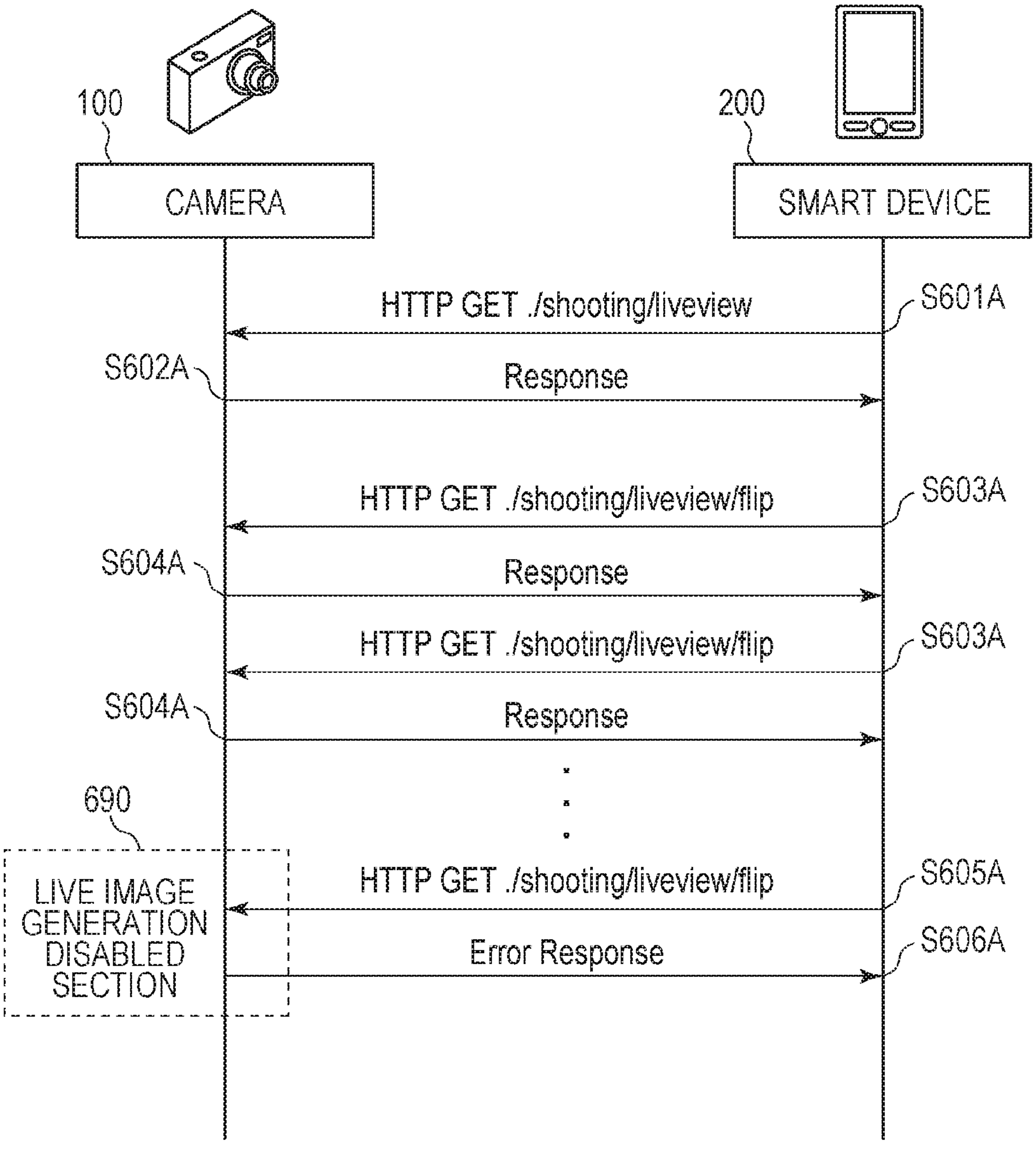
FIG. 6A is an example of a sequence diagram when an API according to the first exemplary embodiment for acquiring a live image frame by frame is executed.
Figure 7A:
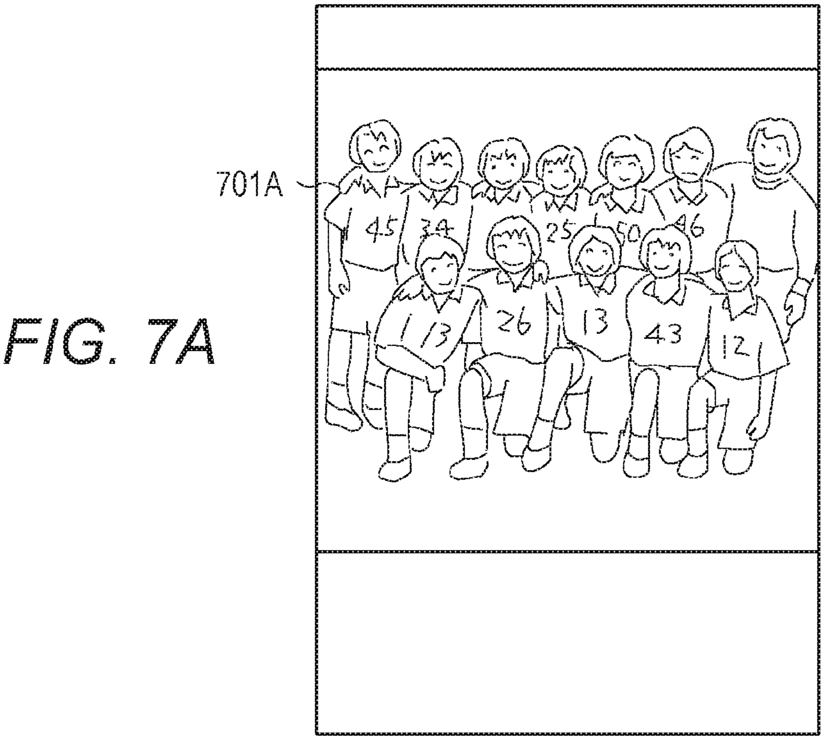
FIG. 7A is a diagram of an example of a UI of the smart device during live view according to the first exemplary embodiment for acquiring a live image frame by frame.
Figure 7B:
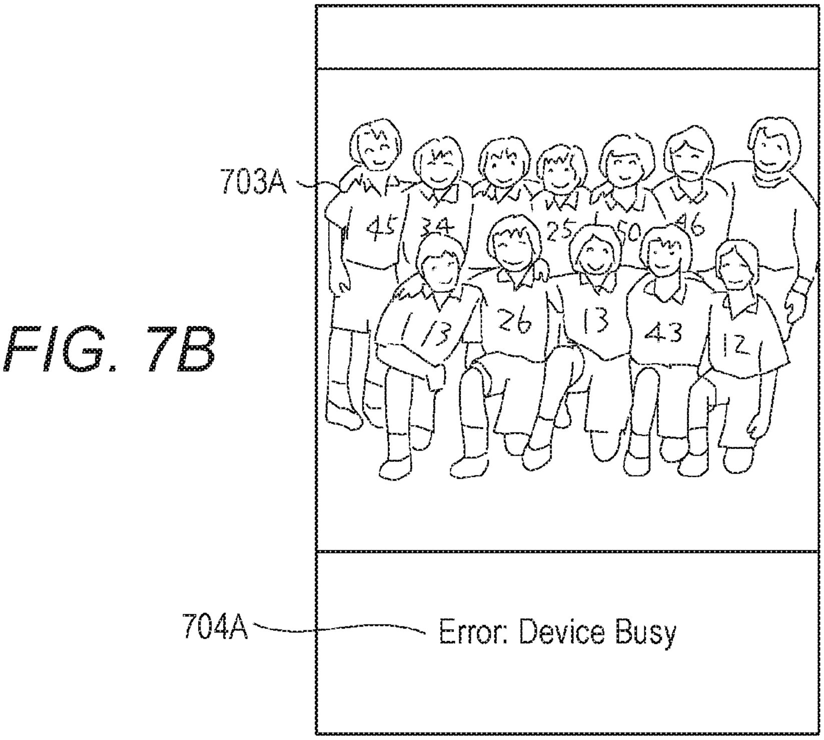
FIG. 7B is a diagram of an example of the UI of the smart device during live view according to the first exemplary embodiment for acquiring a live image frame by frame, when an error occurs in the digital camera.

Firstly, a method of acquiring a live image frame by frame in the chunked transfer will be described. FIG. 6A is an example of a sequence diagram illustrating a process performed when the communication API 502 illustrated in FIG. 5 is executed. FIGS. 7A and 7B are diagrams illustrating an example of a UI screen of the smart device 200 during live view.

In FIG. 6A, steps S601A and S602A are a sequence when the API 501 is executed. In FIG. 6A, steps S603A, S604A, S605A, and S606A are a sequence when the API 502 is executed.

In step S601A, the control unit 201 of the smart device 200 acquires a value for starting generation of a live image recorded in the work memory 204 by program processing. Then, the control unit 201 shapes values for starting generation of the live image into a data set based on a request JSON syntax, describes the data set into the HTTP request body, and requests API 501 from the digital camera 100 by using POST 402, via the communication unit 211. Note that in this step, the control unit 201 commands the size information on the live image and gives a command to display or not to display the live image on the display unit 106 of the digital camera 100, in accordance with the specification of API 501. When the control unit 101 of the digital camera 100 detects reception of this request via the communication unit 111, the control unit 101 analyzes the JSON syntax described in the request body. Then, the control unit 101 starts live image generation processing according to the commands of the size of the live image and whether to display or not to display the live image on the display unit 106 of the digital camera 100, which are requested by the smart device 200. The control unit 101 temporarily records the live image generated in the work memory 104 consecutively.

In step S602A, the control unit 101 of the digital camera 100 shapes response values into a data set based on the JSON syntax, describes the data set in an HTTP response body, and sends the HTTP response body as a response to the smart device 200 via the communication unit 111.

In step S603A, the control unit 201 of the smart device 200 requests API 502 from the digital camera 100 by using GET401, via the communication unit 211.

In step S604A, when the control unit 101 of the digital camera 100 detects reception of this request via the communication unit 111, the control unit 101 acquires the live image temporarily recorded consecutively in the work memory 104, from the work memory 104 and shapes the live image into a response data set. Then, the control unit 101 describes the shaped data set in an HTTP response body and sends the HTTP response body to the smart device 200 via the communication unit 111.

Note that the API 502 is repeatedly executed by the smart device 200 to achieve live view display on the smart device 200. For example, as shown in a screen 701A in FIG. 7A, the live view is displayed on the display unit 206 of the smart device 200.

Here, a description will be made of a case where the control unit 101 of the digital camera 100 cannot generate a live image (live image generation disabled section 690). For example, in a case where a menu for changing shooting parameter setting is displayed on the display unit 106 and in a case where the work memory 104 has no capacity to hold the live image, the control unit 101 of the digital camera 100 does not generate the live image. In addition, for example, in a case where an image stored in the recording medium 110 is developed and in a case where other processing inhibiting the generation of the live image is performed, the control unit 101 of the digital camera 100 cannot generate the live image.

In step S605A, the control unit 201 of the smart device 200 requests API 502 from the digital camera 100 by using GET 401, via the communication unit 211.

In step S606A, when the control unit 101 of the digital camera 100 detects reception of this request via the communication unit 111, the control unit 101 shapes a response data set including an error message describing that the live image cannot be generated. Then, the control unit 101 describes the shaped data set in a response body and sends the response body to the smart device 200 via the communication unit 111. If the control unit 201 of the smart device 200 receives the error message, the control unit 201 determines that an error has occurred in the digital camera 100 by referring to the HTTP response header. Then, the control unit 201 refers to the HTTP response body as necessary and acquires the content or the like of the error. At this time, the control unit 201 of the smart device 200 displays a message 704A on the display unit 206 as shown in FIG. 7B. In the present exemplary embodiment, the control unit 201 displays a live image acquired before the live image generation disabled section 690 begins, as shown in a screen 703A in FIG. 7B. This live image is held in the work memory 204 of the smart device 200. In the present exemplary embodiment, the smart device 200 displays the error message and the live image as described above but is not limited to this description. For example, the smart device 200 may display the message 704A over the screen 703A to notify the user of the occurrence of the error.

The method of acquiring a live image frame by frame has been described above.

DESCRIPTION OF CHUNKED TRANSFER IN THE PRESENT EXEMPLARY EMBODIMENT

Figure 6B:
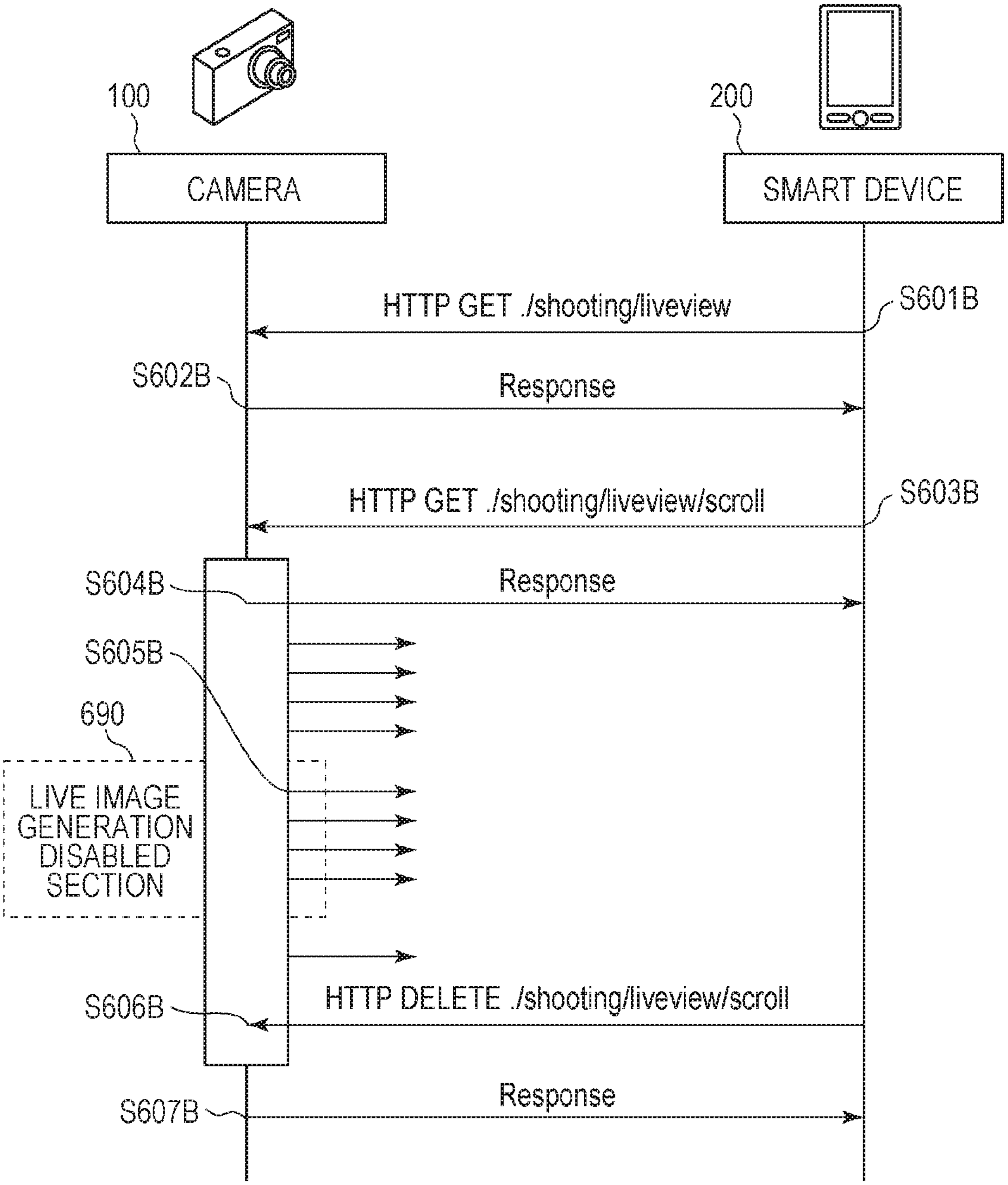
FIG. 6B is an example of a sequence diagram when an API according to the first exemplary embodiment for acquiring a live image of a digital camera through chunked transfer is executed.
Figure 7C:
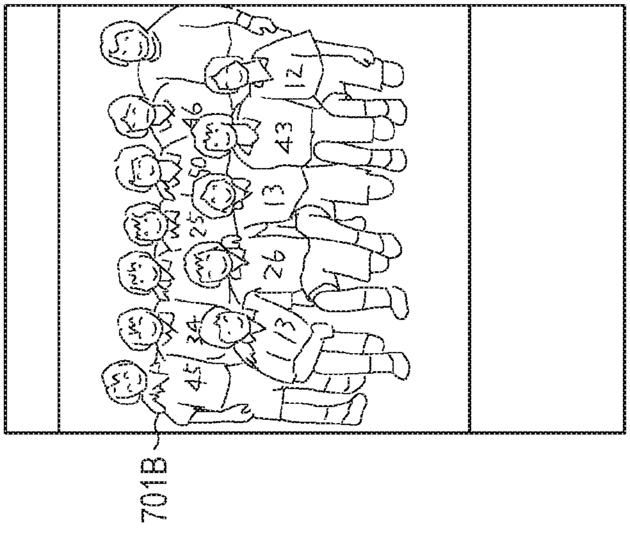
FIG. 7C is a diagram of an example of the UI of the smart device during live view in chunked transfer using the first exemplary embodiment.
Figure 7D:
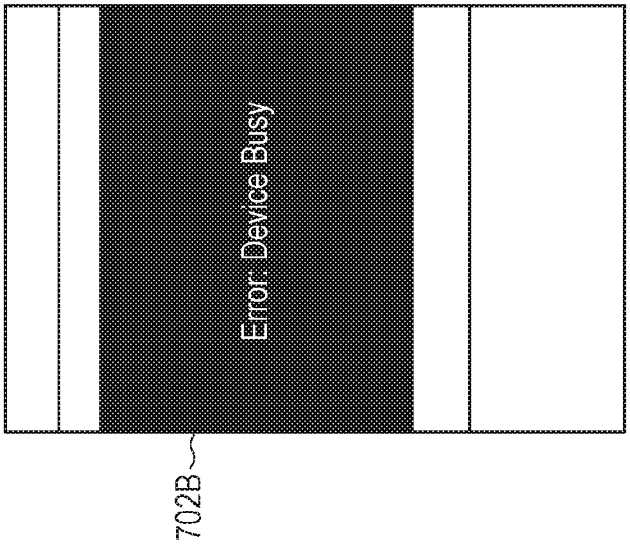
FIG. 7D is a diagram of an example of the UI of the smart device when an error occurs in the digital camera during live view in chunked transfer using the first exemplary embodiment.
Figure 7E:
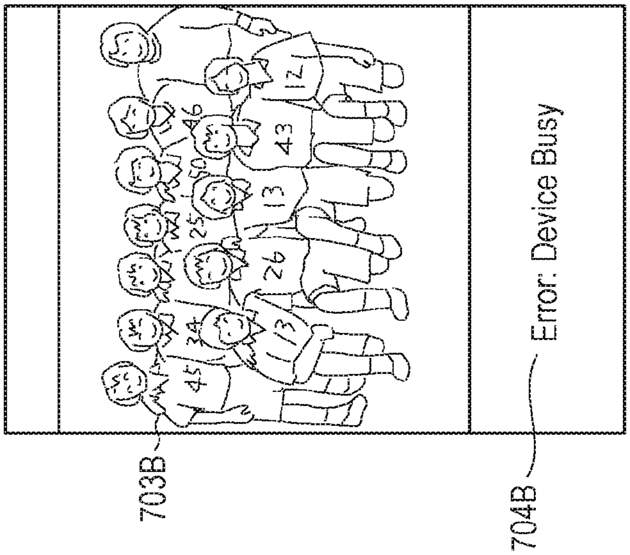
FIG. 7E is a diagram of an example of the UI of the smart device when an error occurs in the digital camera during live view in chunked transfer not using the first exemplary embodiment.

FIG. 6B is an example of a sequence diagram illustrating a process performed when the communication API 503 illustrated in FIG. 5 is executed. FIGS. 7C to 7E are diagrams illustrating an example of a UI screen of the smart device 200 during live view.

In FIG. 6B, steps S601B and S602B are a sequence when API 501 is executed. In FIG. 6B, steps S603B, S604B, S605B, S606B, and S607B are a sequence when API 503 is executed.

In step S601B, the control unit 201 of the smart device 200 acquires a value for starting generation of a live image recorded in the work memory 204 by program processing. Then, the control unit 201 shapes values for starting generation of the live image into a data set based on a request JSON syntax, describes the data set into the HTTP request body, and requests API 501 from the digital camera 100 by using POST 402, via the communication unit 211. Note that in this step, the control unit 201 commands the size information on the live image and gives a command to display or not to display the live image on the display unit 106 of the digital camera 100, in accordance with the specification of API 501. When the control unit 101 of the digital camera 100 detects reception of this request via the communication unit 111, the control unit 101 analyzes the JSON syntax described in the request body. Then, the control unit 101 starts live image generation processing according to the commands of the size of the live image and whether to display or not to display the live image on the display unit 106 of the digital camera 100, which are requested by the smart device 200. The control unit 101 temporarily records the live image generated in the work memory 104 consecutively.

In step S602B, the control unit 101 of the digital camera 100 shapes response values into a data set based on the JSON syntax, describes the data set in an HTTP response body, and sends the HTTP response body as a response to the smart device 200 via the communication unit 111.

In step S603B, the control unit 201 of the smart device 200 requests API 503 from the digital camera 100 by using GET 401 via the communication unit 211.

In step S604B, when the control unit 101 of the digital camera 100 detects that this request is received via the communication unit 111, the control unit 101 reads the live image from the work memory 104. The control unit 101 shapes the acquired live image into a response data set. Then, the control unit 101 describes the shaped data set in an HTTP response body and sends the HTTP response body to the smart device 200 via the communication unit 111. As shown in a screen 701B in FIG. 7C, the control unit 201 of the smart device 200 displays the received live image on the display unit 206 as a live view. The control unit 101 of the digital camera 100 sequentially sends the live image temporarily recorded in the work memory 104 consecutively to the smart device 200.

Here, a description will be made of a case where the control unit 101 of the digital camera 100 cannot generate a live image (live image generation disabled section 690). For example, in a case where a menu for changing shooting parameter setting is displayed on the display unit 106 and in a case where the work memory 104 has no capacity to hold the live image, the control unit 101 of the digital camera 100 cannot generate the live image. In addition, for example, in a case where an image stored in the recording medium 110 is developed and in a case where other processing inhibiting the generation of the live image is performed, the control unit 101 of the digital camera 100 cannot generate the live image. Here, in a case where the digital camera 100 displays the menu for changing the shooting parameter setting on the display unit 106, the menu is displayed on the display unit 106. For example, in a case where the work memory 104 has no capacity to hold the live image or in a case where an image stored in the recording medium 110 is developed, the digital camera 100 displays a warning that the live image cannot be generated on the display unit 106.

Furthermore, as described above, when API 503 is executed, the digital camera 100 cannot send to the smart device 200 the content of an error by using the HTTP response header. Therefore, in the present exemplary embodiment, the digital camera 100 sends a dummy image for providing notification of the content of the error to the smart device 200.

In step S605B, the control unit 101 of the digital camera 100 generates a dummy image and shapes the dummy image into a response data set. Then, the control unit 101 describes the shaped data set in an HTTP response body and sends the HTTP response body to the smart device 200 via the communication unit 111. For example, the digital camera 100 generates, as the dummy image, an image describing an error message as shown in a screen 702B in FIG. 7D. Thus, likewise before the live image generation disabled section 690, the digital camera 100 displays the sent image on the display unit 206 of the smart device 200 to notify the user of the content of the error. Here, the smart device 200 does not analyze the received live image. In the present exemplary embodiment, the dummy image is an image describing the error message but the dummy image is not necessarily limited to this description. For example, a simple all black image may be used as the dummy image. Furthermore, in the present exemplary embodiment, the control unit 101 of the digital camera 100 generates the dummy image with the same resolution and the same aspect ratio as the live image. Thus, the control unit 201 of the smart device 200 is operable to smoothly switch the display without adding processing such as view angle adjustment even when receiving the dummy image. Accordingly, the control unit 201 of the smart device 200 does not need to perform special processing, such as analyzing the data set received from the digital camera 100 or adjusting the view angle of the image, even in the live image generation disabled section 690.

In step S606B, in order to finish the live view, the control unit 201 of the smart device 200 requests API 503 from the digital camera 100 by using DELETE 404, via the communication unit 211.

In step S607B, when the control unit 101 of the digital camera 100 detects reception of this request via the communication unit 111, the control unit 101 shapes a response data set where the size information on the live image is set as zero. Then, the control unit 101 describes the shaped data set in a response body and sends the response body to the smart device 200 via the communication unit 111. The smart device 200 which has received this data set finishes the live view display. As a result, the chunked transfer between the digital camera 100 and the smart device 200 is finished.

The chunked transfer according to the present exemplary embodiment has been described above.

Next, an example of the operation of the digital camera 100 and an example of the operation of the smart device 200 according to the present exemplary embodiment will be described.

Figure 6C:
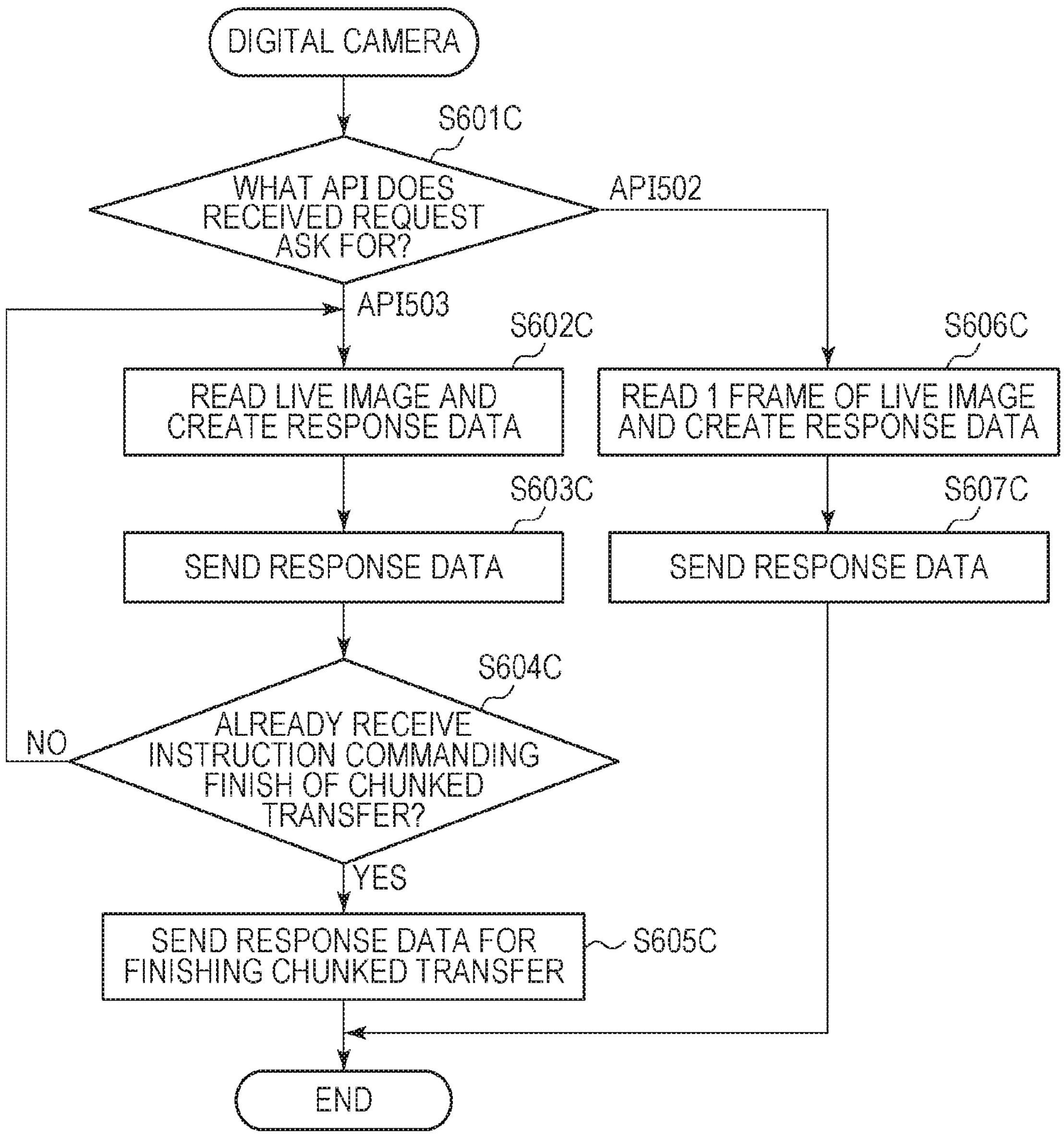
FIG. 6C is a flowchart illustrating an example of an operation of a digital camera according to the first exemplary embodiment.

FIG. 6C is a flowchart illustrating an example of the operation of the digital camera 100 according to the present exemplary embodiment. The control unit 101 of the digital camera 100 starts the present processing, when detecting that a request is made by the smart device 200 by using GET 401 via the communication unit 111.

In step S601C, the control unit 101 determines the type of API which the received request asks for. If it is determined that the request is made through API 502, the control unit 101 proceeds to step S606C to send one frame of a live image. This case corresponds to step S603A in FIG. 6A. If it is determined that the request is made through API 503, the control unit 101 proceeds to step S602C to send the live image by chunked transfer. This case corresponds to step S603B in FIG. 6B.

In step S602C, the control unit 101 reads the live image from the work memory 104, creates response data from the live image, and records the response data in the work memory 104.

In step S603C, the control unit 101 sends the created response data to the smart device 200 via the communication unit 111. This step corresponds to step S604B in FIG. 6B.

In step S604C, the control unit 101 determines whether an instruction commanding the finish of the chunked transfer is received from the smart device 200 via the communication unit 111. If the instruction commanding the finish of the chunked transfer is received from the smart device 200, the control unit 101 proceeds to step S605C. If the instruction commanding the finish of the chunked transfer is not received from the smart device 200, the control unit 101 returns to step S602C and continues the chunked transfer.

In step S605C, the control unit 101 sends response data for finishing the chunked transfer to the smart device 200 via the communication unit 111.

In step S606C, the control unit 101 reads the live image from the work memory 104, creates response data from the live image, and records the response data in the work memory 104.

In step S607C, the control unit 101 sends the created response data to the smart device 200 via the communication unit 111. When no error has occurred, this step corresponds to step S604A in FIG. 6A.

An example of the operation of the digital camera 100 according to the present exemplary embodiment has been described above.

Figure 6D:
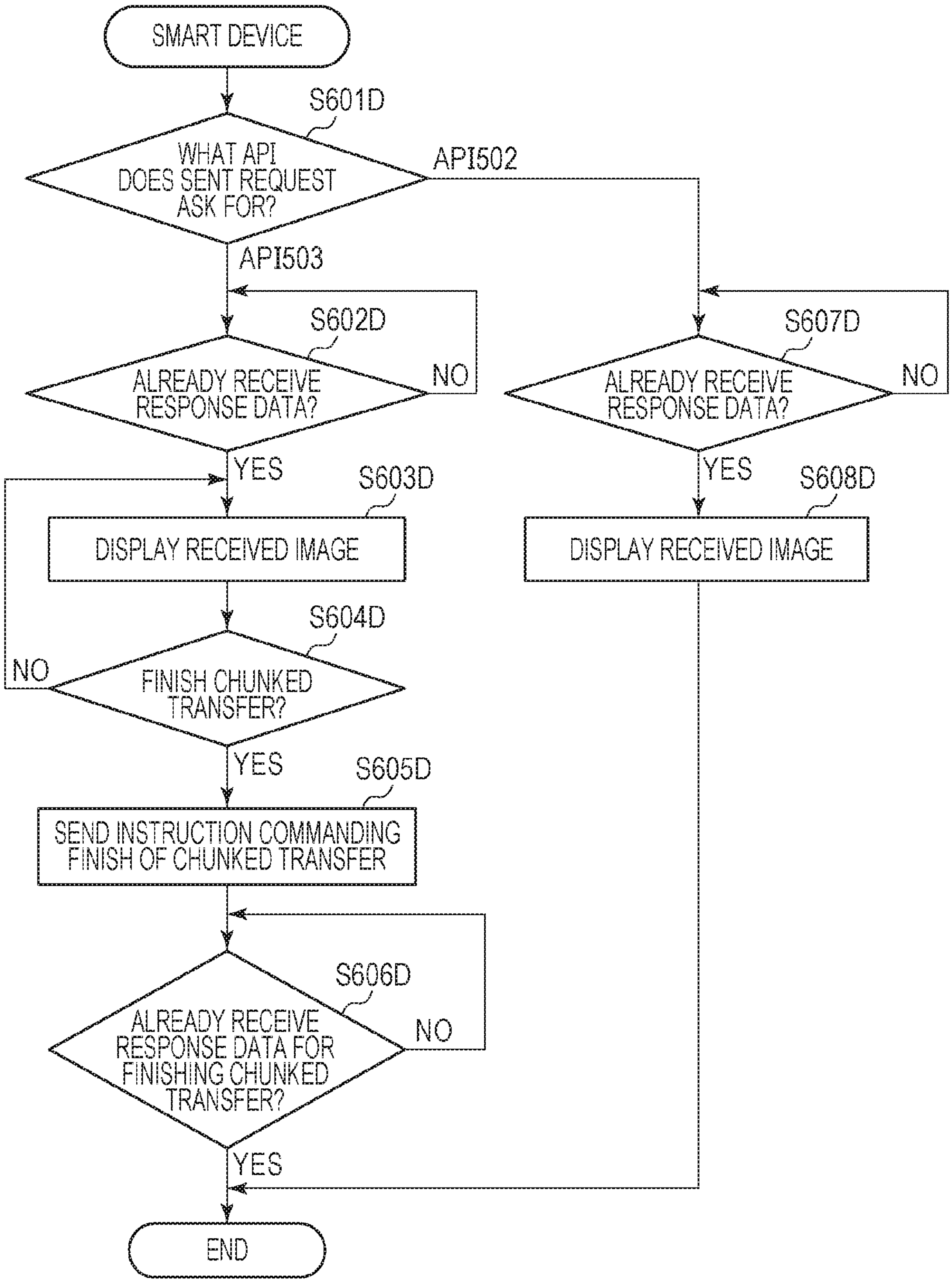
FIG. 6D is a flowchart illustrating an example of an operation of a smart device according to the first exemplary embodiment.

Next, an example of the operation of the smart device 200 will be described. FIG. 6D is a flowchart illustrating an example of the operation of the smart device 200 according to the present exemplary embodiment. The control unit 201 of the smart device 200 starts the present processing, when making a request to the digital camera 100 by using GET 401 via the communication unit 211.

In step S601D, the control unit 201 determines the type of API which the sent request asks for. When the request is made through API 502, the control unit 201 proceeds to step S607D to acquire one frame of a live image. This case corresponds to step S603A in FIG. 6A. When the request is made through API 503, the control unit 201 proceeds to step S602D to acquire the live image by chunked transfer. This case corresponds to step S603B in FIG. 6B.

In step S602D, the control unit 201 determines whether response data is received. If the response data is received, the control unit 201 proceeds to step S603D. If no response data is received, the control unit 201 repeats this processing. This step corresponds to step S604D in FIG. 6B.

In step S603D, the control unit 201 displays the received live image on the display unit 206.

In step S604D, the control unit 201 determines whether to finish the chunked transfer. For example, the control unit 201 determines the finish of the chunked transfer when receiving an instruction commanding the finish of live view from the user via the operation unit 205 (touch panel or the like). If the chunked transfer is finished, the control unit 201 proceeds to step S605D. If the chunked transfer is not finished, the control unit 201 returns to step S603D and continues the chunked transfer.

In step S605D, the control unit 201 sends an instruction commanding the finish of the chunked transfer to the digital camera 100 via the communication unit 211.

In step S606D, the control unit 201 determines whether response data for finishing the chunked transfer is received via the communication unit 211. If the response data for finishing the chunked transfer is received, the control unit 201 finishes the process. When no response data for finishing the chunked transfer is received, the control unit 201 repeats the process of this step.

In step S607D, the control unit 201 determines whether response data is received in order to acquire a live image. If the response data is received, the control unit 201 proceeds to step S603D. If no response data is received, the control unit 201 repeats this processing. This step corresponds to step S604D in FIG. 6B.

In step S608D, the control unit 201 displays the received live image on the display unit 206, and the process ends.

An example of the operation of the smart device 200 has been described above. Note that in a case where live view display is performed through API 502 according to the present exemplary embodiment, the smart device 200 obtains one frame of a live image and automatically requests API 502 again by using GET 401, repeating the processing of acquiring one frame of the live image.

Hereinafter, a description is made of the effects of reducing a burden in implementation of an application on the counterpart device in chunked transfer according to the present exemplary embodiment.

Effects of Reducing Burden in Implementation of Application on Counterpart Device According to Exemplary Embodiment Here, a description is made of the effects of reducing a burden in implementation of an application on the counterpart device, by comparing a conventional method with the chunked transfer according to the present exemplary embodiment. Firstly, the problems of a conventional method of acquiring a live image frame by frame and conventional chunked transfer not using the present exemplary embodiment will be described, and then the effects of the chunked transfer according to the present exemplary embodiment will be described.

Figure 8A:
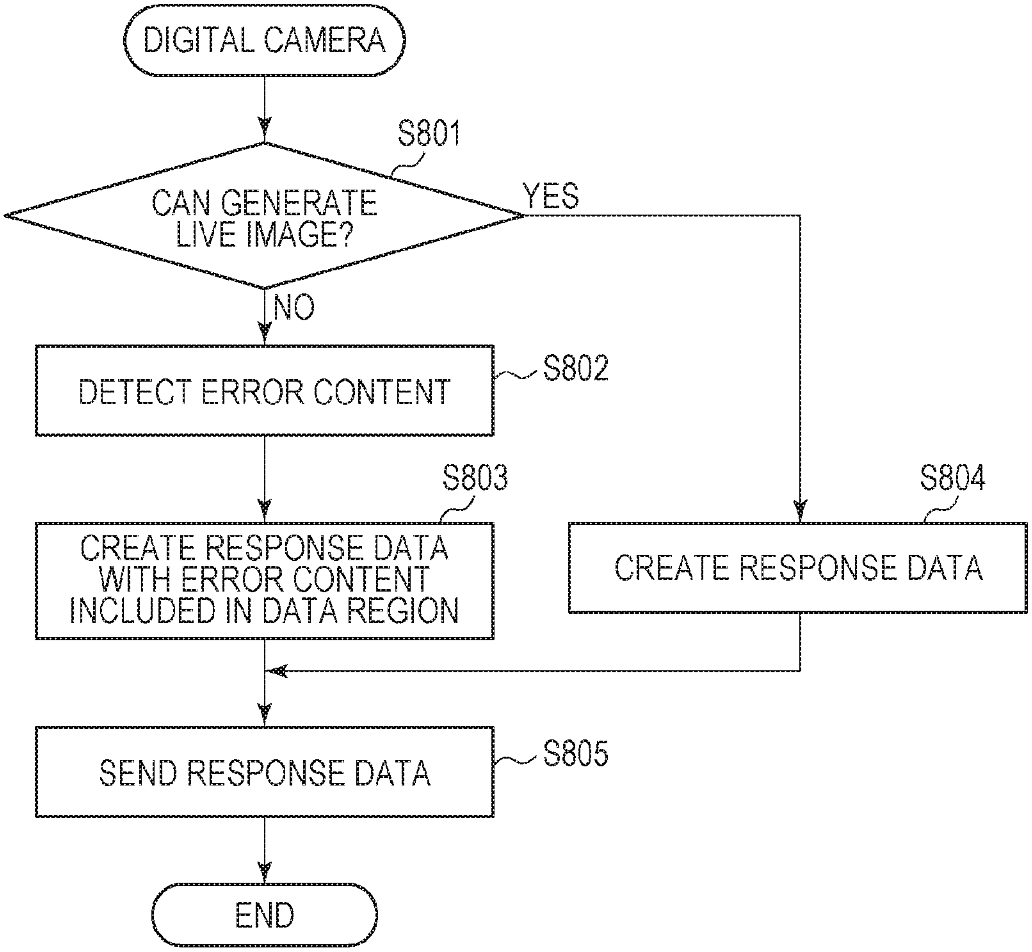
FIG. 8A is a flowchart illustrating an example of an operation of the digital camera when a live image is acquired frame by frame in the first exemplary embodiment.

Firstly, an example of the operation of the digital camera 100 and an example of the operation of the smart device 200, in the method of acquiring a live image frame by frame in the present exemplary embodiment will be described. FIG. 8A is a flowchart illustrating an example of the operation of the digital camera 100 in a case where a live image is acquired frame by frame in the present exemplary embodiment. The control unit 101 of the digital camera 100 starts the present processing, when detecting that API 502 is requested by the smart device 200 by using GET 401 via the communication unit 111. This trigger corresponds to step S603A and step S605A in FIG. 6A.

In step S801, the control unit 101 determines whether a live image can be generated. If the live image cannot be generated, the control unit 101 proceeds to step S802. If the live image can be generated, the control unit 101 proceeds to step S803.

In step S802, the control unit 101 detects the content of an error causing no generation of the live image.

In step S803, the control unit 101 describes data for providing notification of occurrence of the error in an HTTP response header to create response data and records the data in the work memory 104. Here, the control unit 101 may describe a specific content of the error in the HTTP response body to create the response data.

In step S804, the control unit 101 reads the live image from the work memory 104, creates response data from the live image, and records the response data in the work memory 104.

In step S805, the control unit 101 sends the created response data to the smart device 200 via the communication unit 111. When no error has occurred, this step corresponds to step S603A in FIG. 6A. When an error has occurred, this step corresponds to step S606A in FIG. 6A.

An example of the operation of the digital camera 100 in a case where the live image is acquired frame by frame in the present exemplary embodiment has been described above.

Figure 8B:
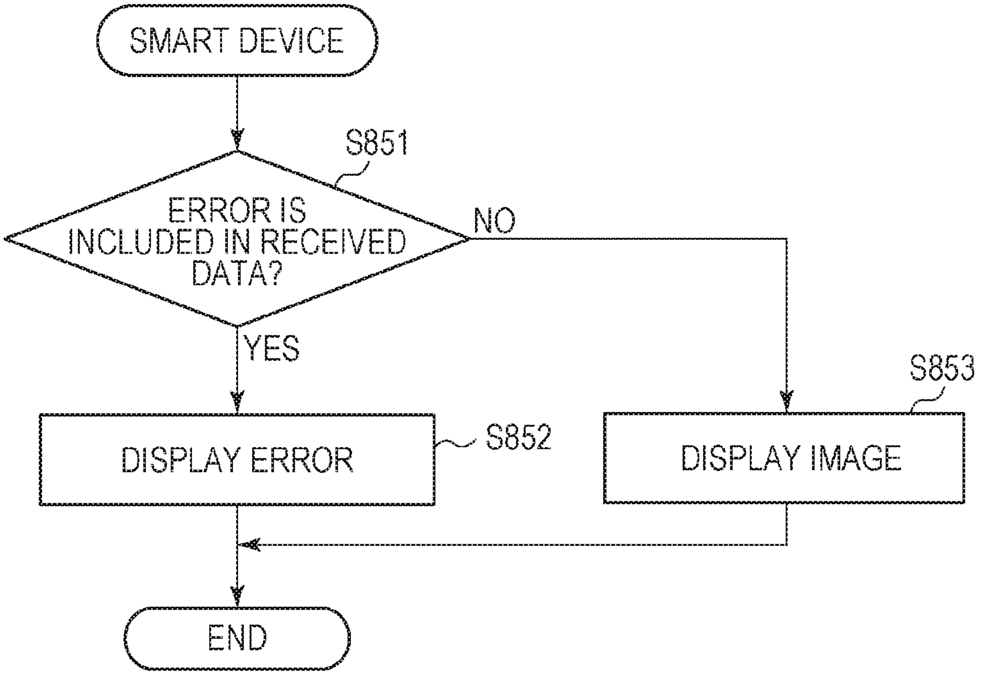
FIG. 8B is a flowchart illustrating an example of an operation of the smart device when a live image is acquired frame by frame in the first exemplary embodiment.

FIG. 8B is a flowchart illustrating an example of the operation of the smart device 200 in a case where a live image is acquired frame by frame in the present exemplary embodiment. This processing is started when the control unit 201 of the smart device 200 requests API 502 from the digital camera 100 by using GET 401 via the communication unit 211 and receives a live image as a response from the digital camera 100. This trigger corresponds to steps S604A and S606A in FIG. 6A.

In step S851, the control unit 201 analyzes a received response data and determines whether data for providing notification of occurrence of an error is included. For example, the control unit 201 determines whether the data for providing notification of occurrence of an error is included in an HTTP response header of the response data. If it is determined that the response data includes the data for providing notification of occurrence of an error, the control unit 201 proceeds to step S852. If it is determined that the response data includes no data for providing notification of occurrence of an error, the control unit 201 proceeds to step S853.

In step S852, the control unit 201 displays the content of the error analyzed in step S851 on the display unit 206. For example, as illustrated in FIG. 7E, the control unit 201 displays the live image received before the live image generation disabled section 690 begins, on a screen 703B. This live image is held in the work memory 204 of the smart device 200. The control unit 201 displays an error message 704B below the screen 703B. In addition, for example, the control unit 201 may notify the user of the occurrence of an error by displaying the error message 704B over the screen 702B. This live image is held in the work memory 204 of the smart device 200. When an HTTP response body of the received response data includes detailed contents of the error, the control unit 201 may display the contents on the display unit 206.

In step S853, since no data for providing notification of occurrence of an error is included in the received response data, as a result of the analysis, the control unit 201 displays the live image included in the received response data.

An example of the operation of the smart device 200 in a case where the live image is acquired frame by frame in the present exemplary embodiment has been described above. In such a case, the smart device 200 needs an algorithm for analyzing data sent by the digital camera 100 each time in implementation of an application.

Figure 9A:
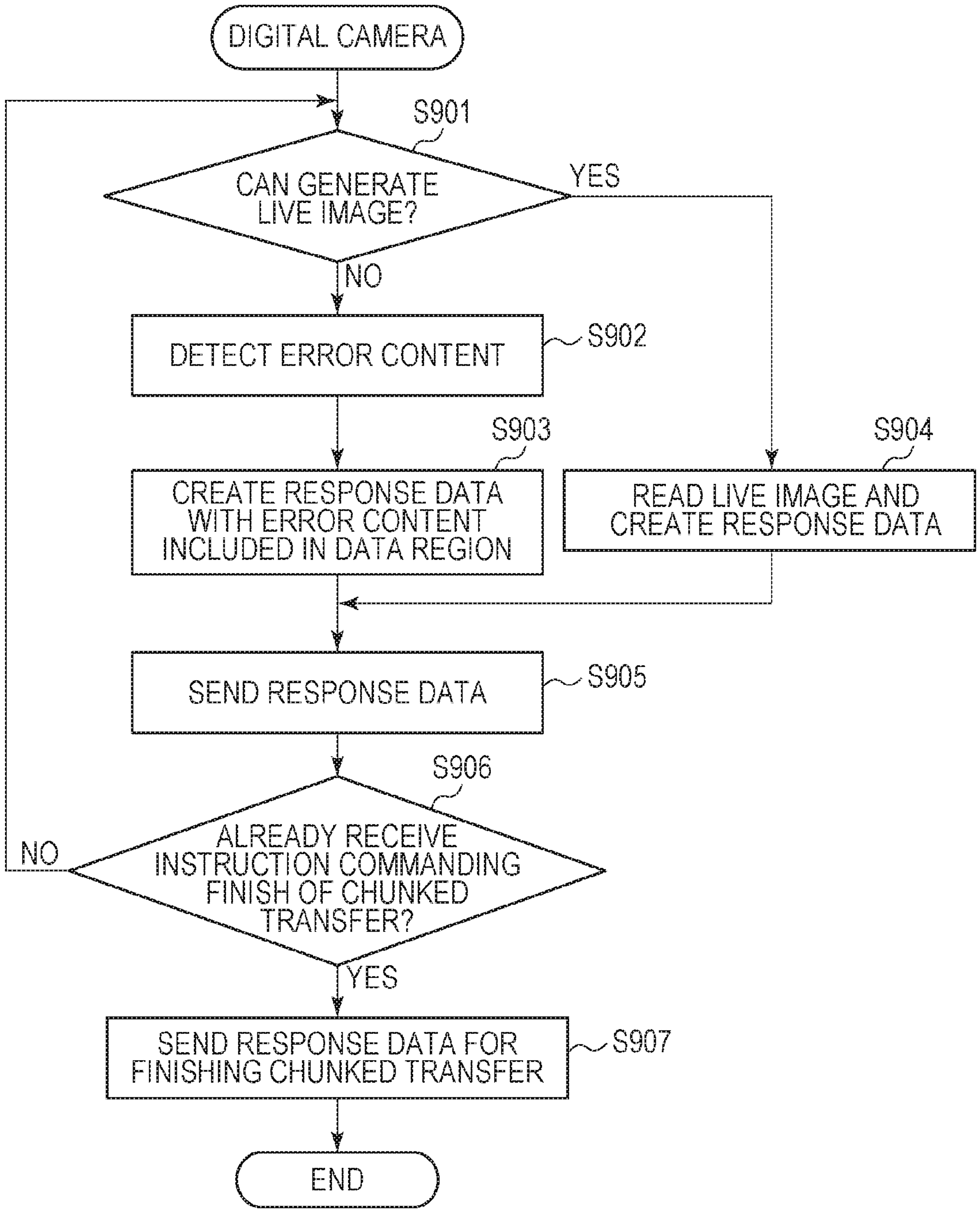
FIG. 9A is a flowchart illustrating an example of an operation of the digital camera in chunked transfer not using the first exemplary embodiment.

Next, an example of the operation of the digital camera 100 and an example of the operation of the smart device 200 in conventional chunked transfer not using the present exemplary embodiment will be described. FIG. 9A is a flowchart illustrating an example of the operation of the digital camera 100 in the conventional chunked transfer not using the present exemplary embodiment. The control unit 101 of the digital camera 100 starts the present processing, when detecting that API 503 is requested by the smart device 200 by using GET 401 via the communication unit 111. This trigger corresponds to step S603B in FIG. 6B.

In step S901, the control unit 101 determines whether a live image can be generated. If the live image cannot be generated, the control unit 101 proceeds to step S902. If the live image can be generated, the control unit 101 proceeds to step S903.

In step S902, the control unit 101 detects the content of an error causing no generation of the live image.

In step S903, the control unit 101 describes data for providing notification of occurrence of the error in an HTTP response body to create response data and records the data in the work memory 104.

In step S904, the control unit 101 reads the live image from the work memory 104, creates response data from the live image, and records the response data in the work memory 104.

In step S905, the control unit 101 sends the created response data to the smart device 200 via the communication unit 111.

In step S906, the control unit 101 determines whether an instruction commanding the finish of the chunked transfer is received from the smart device 200 via the communication unit 111. If the instruction commanding the finish of the chunked transfer is received from the smart device 200, the control unit 101 proceeds to step S907. If the instruction commanding the finish of the chunked transfer is not received from the smart device 200, the control unit 101 returns to step S901 and repeats this processing.

In step S907, the control unit 101 sends response data for finishing the chunked transfer to the smart device 200 via the communication unit 111.

An example of the operation of the digital camera 100 in a case where the present exemplary embodiment is not used has been described above.

Figure 9B:
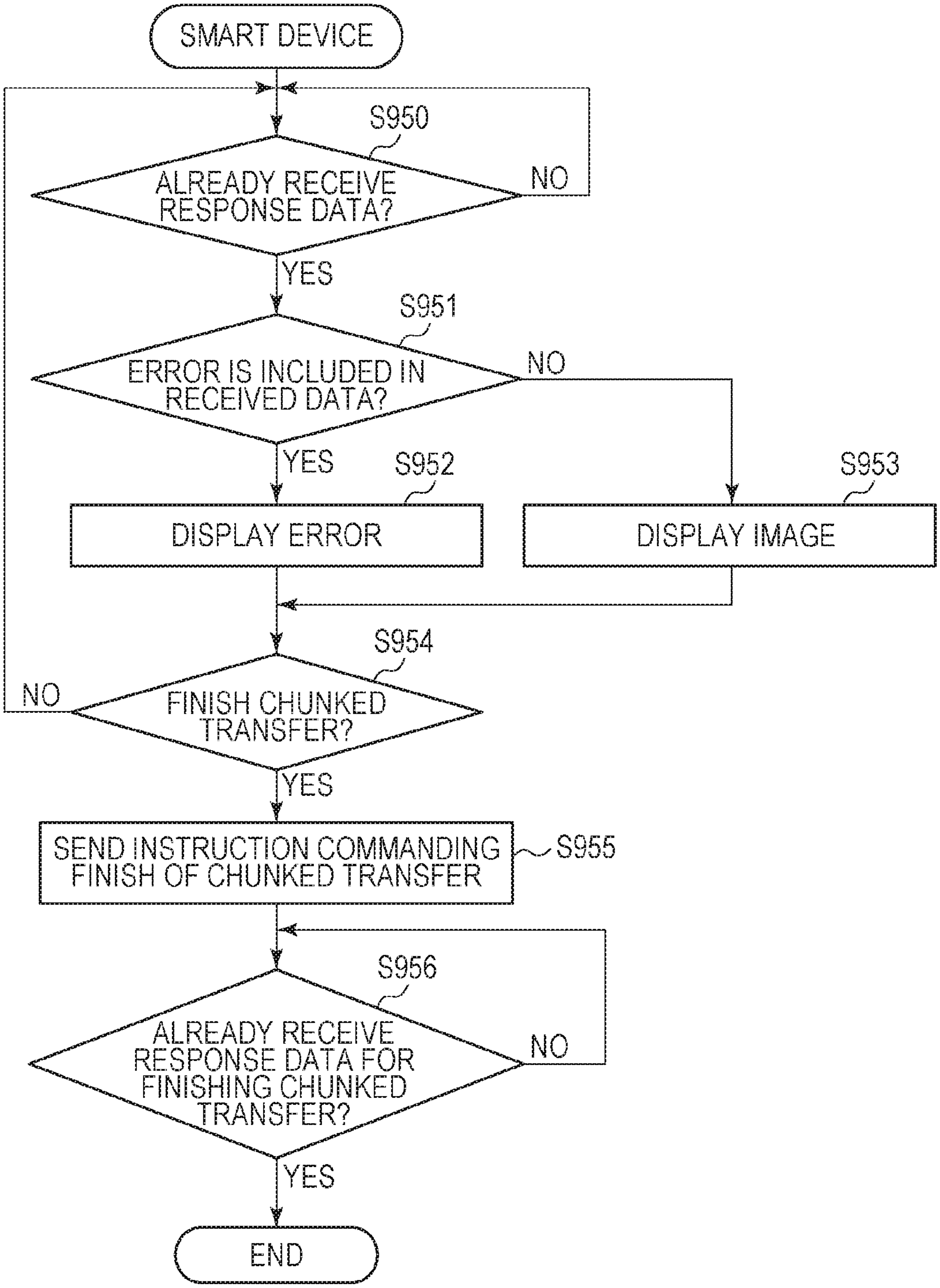
FIG. 9B is a flowchart illustrating an example of an operation of the smart device in the chunked transfer not using the first exemplary embodiment.

FIG. 9B is a flowchart illustrating an example of the operation of the smart device 200 in the conventional chunked transfer not using the present exemplary embodiment will be described. The control unit 201 of the smart device 200 starts the present processing, when requesting API 503 from the digital camera 100 by using GET 401 via the communication unit 211. This trigger corresponds to step S603B in FIG. 6B.

In step S950, the control unit 201 determines whether response data is received. If the response data is received, the control unit 201 proceeds to step S951. If the response data is not received, the control unit 201 repeats step S950. However, the control unit 201 considers no reception of the response data for a predetermined time or longer as occurrence of an error in the digital camera 100, displays the error on the display unit 206, and finishes the processing.

In step S951, the control unit 201 analyzes a received response data and determines whether data for providing notification of occurrence of an error is included. If it is determined that the response data includes the data for providing notification of occurrence of an error, the control unit 201 proceeds to step S952. If it is determined that the response data includes no data for providing notification of occurrence of an error, the control unit 201 proceeds to step S953.

In step S952, the control unit 201 displays the content of the error analyzed in step S951 on the display unit 206. For example, as illustrated in FIG. 7E, the control unit 201 displays the live image received before the live image generation disabled section 690 begins, on the screen 703B. This live image is held in the work memory 204 of the smart device 200. The control unit 201 displays an error message 704B below the screen 703B. In addition, for example, the control unit 201 may notify the user of the occurrence of an error by displaying the error message 704B over the screen 702B. This live image is held in the work memory 204 of the smart device 200.

In step S953, since no data for providing notification of occurrence of an error is included in the received response data, as a result of the analysis, the control unit 201 displays the live image included in the received response data.

In step S954, the control unit 201 determines whether to finish the chunked transfer. For example, the control unit 201 determines the finish of the chunked transfer when receiving an instruction commanding the finish of live view from the user via the operation unit 205 (touch panel or the like). If the chunked transfer is finished, the control unit 201 proceeds to step S955. If the chunked transfer is not finished, the control unit 201 returns to step S901 and continues the chunked transfer.

In step S955, the control unit 201 sends an instruction commanding the finish of the chunked transfer to the digital camera 100 via the communication unit 211.

In step S956, the control unit 201 determines whether response data for finishing the chunked transfer is received via the communication unit 211. If the response data for finishing the chunked transfer is received, the control unit 201 finishes the process. When no response data for finishing the chunked transfer is received, the control unit 201 repeats the process of this step.

An example of the operation of the smart device 200 in the chunked transfer not using the present exemplary embodiment has been described above. In such conventional chunked transfer, the smart device 200 needs an algorithm for analyzing response data sent by the digital camera 100 in the implementation of the application.

Figure 10A:
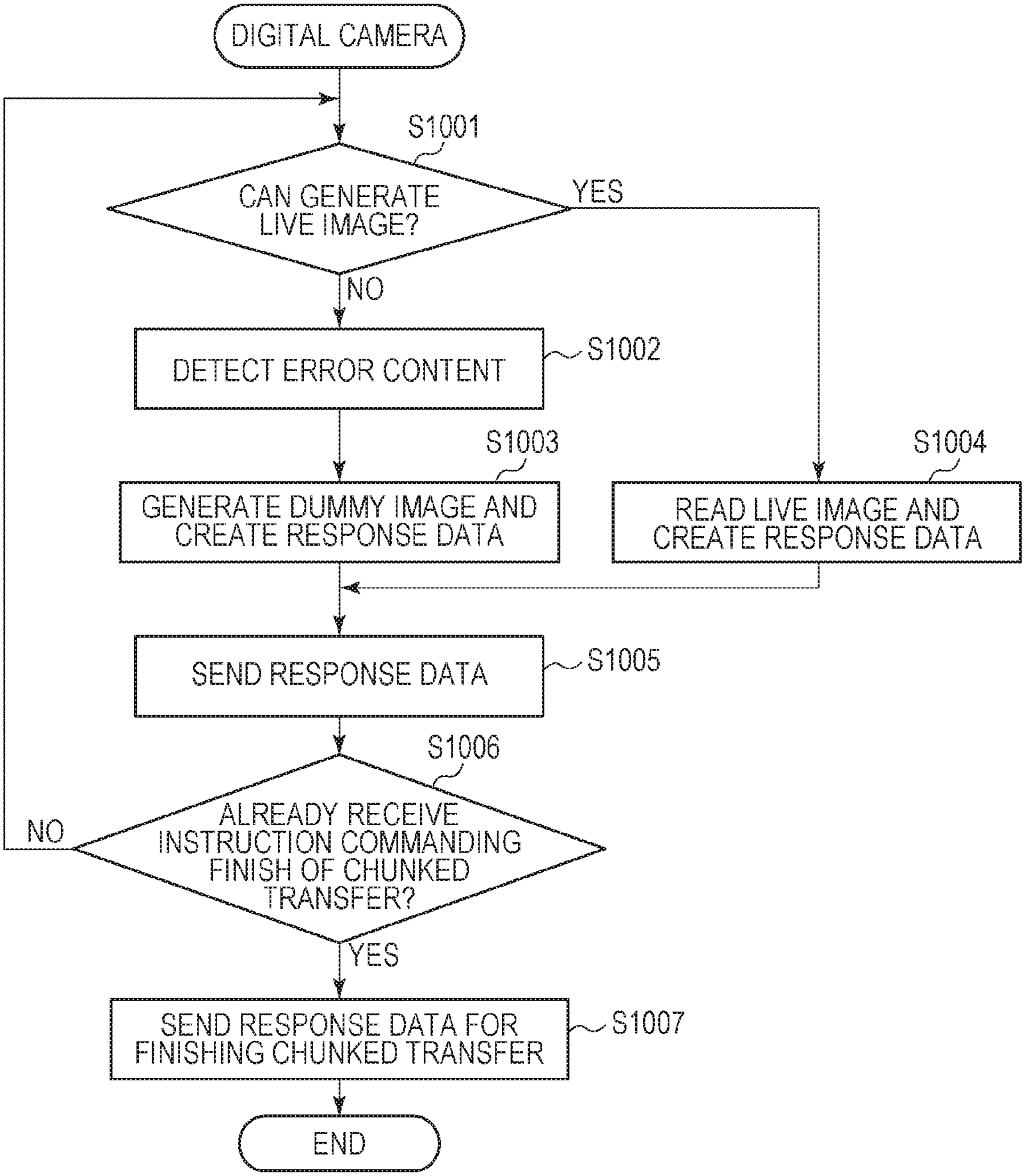
FIG. 10A is a flowchart illustrating an example of an operation of the digital camera in chunked transfer using the first exemplary embodiment.

Finally, examples of the operations of the digital camera 100 and the smart device 200 in the chunked transfer using the present exemplary embodiment will be described, compared with the example of the conventional chunked transfer. FIG. 10A is a flowchart illustrating an example of the operation of the digital camera 100 according to the present exemplary embodiment. The control unit 101 of the digital camera 100 starts the present processing via the communication unit 111, when detecting that API 503 is requested by the smart device 200 by using GET401. This trigger corresponds to step S603B in FIG. 6B.

In step S1001, the control unit 101 determines whether a live image can be generated. If the live image cannot be generated, the control unit 101 proceeds to step S1002. If the live image can be generated, the control unit 101 proceeds to step S1003. This step is the same as step S901 in FIG. 9A.

In step S1002, the control unit 101 detects the content of an error causing no generation of the live image. This step is the same as step S902 in FIG. 9A.

In step S1003, the control unit 101 generates a dummy image as data to be sent and stores the dummy image in the work memory 104. Here, the control unit 101 puts a message indicating the content of the error detected in step S1002 in the dummy image. This message is included in the dummy image so as to be a message visible to the user. Note that a load of processing for generating the dummy image is not larger than that of processing for reading the live image. Furthermore, the processing for generating the dummy image may use processing for reading an image for providing notification of an error, which is prepared in advance. In this case, the image for providing notification of an error is recorded in the nonvolatile memory 103.

In step S1004, since the live image can be generated, the control unit 101 reads the live image, generates response data, and stores the data in the work memory 104.

In step S1005, the control unit 101 sends the response data stored in the work memory 104 to the smart device 200 via the communication unit 111, and finishes the process.

In step S1006, the control unit 101 determines whether an instruction commanding the finish of the chunked transfer is received from the smart device 200 via the communication unit 111. If the instruction commanding the finish of the chunked transfer is received from the smart device 200, the control unit 101 proceeds to step S1007. If the instruction commanding the finish of the chunked transfer is not received from the smart device 200, the control unit 101 returns to step S1001 and repeats this processing.

In step S1007, the control unit 101 sends response data for finishing the chunked transfer to the smart device 200 via the communication unit 111.

An example of the operation of the digital camera 100 in a case where the present exemplary embodiment is used has been described above.

Figure 10B:
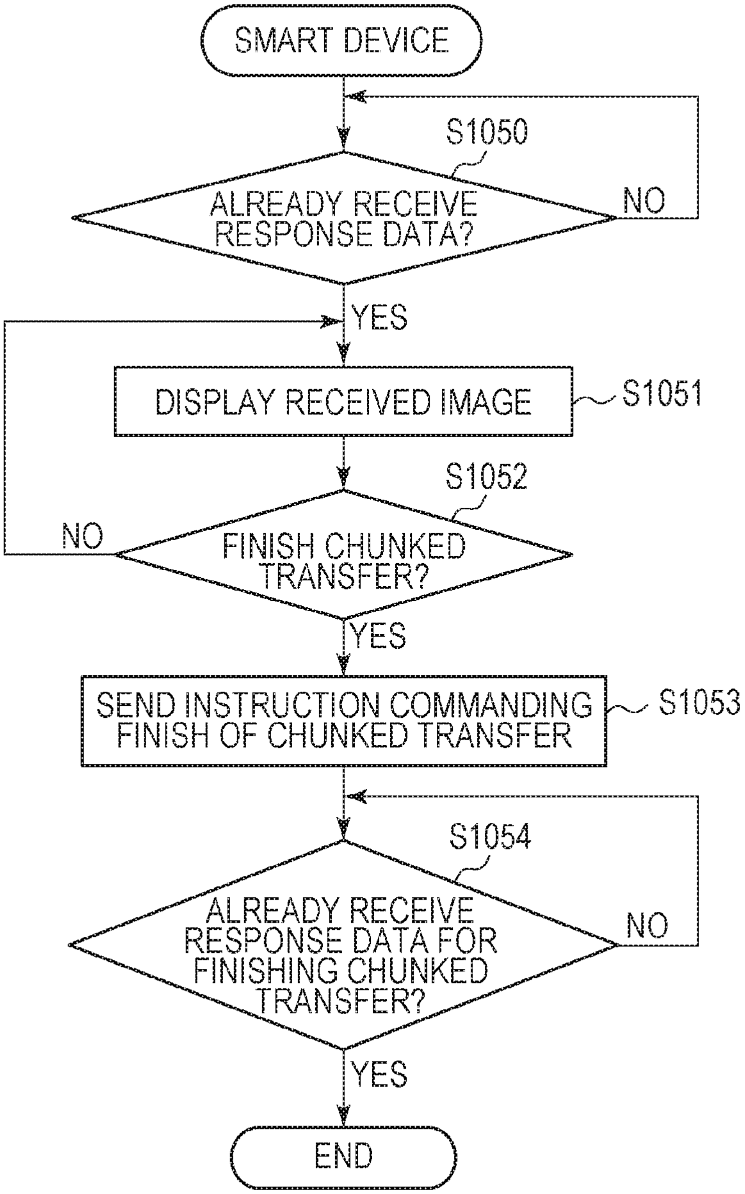
FIG. 10B is a flowchart illustrating an example of an operation of the smart device in chunked transfer using the first exemplary embodiment.

A process performed by the smart device 200 according to the present exemplary embodiment will be described with reference to FIG. 10B. This flowchart is started when the control unit 201 of the smart device 200 requests API 503 from the digital camera 100 by using GET 401 via the communication unit 211 and receives a live image as a response. This trigger corresponds to step S604B in FIG. 6B.

In step S1050, the control unit 201 determines whether response data is received. If the response data is received, the control unit 201 proceeds to step S1051. If the response data is not received, the control unit 201 repeats step S1050. However, the control unit 201 considers no reception of the response data for a predetermined time or longer as occurrence of an error in the digital camera 100, displays the error on the display unit 206, and finishes the processing.

In step S1051, the control unit 201 displays the received live image on the display unit 206. This step corresponds to step S604B in FIG. 6B.

In step S1052, the control unit 201 determines whether to finish the chunked transfer. For example, the control unit 201 determines the finish of the chunked transfer when receiving an instruction commanding the finish of live view from the user. If the chunked transfer is finished, the control unit 201 proceeds to step S1053. If the chunked transfer is not finished, the control unit 201 returns to step S1051 and continues the chunked transfer.

In step S1053, the control unit 201 sends an instruction commanding the finish of the chunked transfer to the digital camera 100 via the communication unit 211.

In step S1054, the control unit 201 determines whether response data for finishing the chunked transfer is received via the communication unit 211. If the response data for finishing the chunked transfer is received, the control unit 201 finishes the process. When no response data for finishing the chunked transfer is received, the control unit 201 repeats the process of this step.

An example of the operation of the smart device 200 in a case where the present exemplary embodiment is used has been described above.

As described above, in the conventional method of acquiring a live image frame by frame and conventional chunked transfer not using the present exemplary embodiment, the smart device 200 as the counterpart device is required to analyze whether received response data includes an error. On the other hand, in an API for acquiring a live image by the chunked transfer according to the present exemplary embodiment, in a case where the digital camera 100 cannot generate a live image, a dummy image is sent instead. The smart device 200 displays the dummy image received from the digital camera 100 without analyzing whether an error is included. Therefore, in the chunked transfer in the present exemplary embodiment, the smart device 200 needs no algorithm for analyzing data sent by the digital camera 100 in implementation of the application. Thus, the burden in implementation of an application using the communication API can be reduced. In particular, this method can reduce a burden in implementation of an application on the smart device 200. Furthermore, the digital camera 100 changes a dummy image into an image visually displaying the content of an error, reducing processing performed by the smart device 200.

In the present exemplary embodiment, an example in which the digital camera 100 sends a live image to the smart device 200 has been described. However, data sent to the smart device 200 by the digital camera 100 is not limited to the live image. For example, a case where the digital camera 100 has a function of capturing an image of a user and projecting the user's action, such as facial expressions or gestures, on an avatar image will be described. In this case, the digital camera 100 creates video data as a live image in real time from an avatar image on which the user's action is reflected. Then, the video data is sequentially sent as the live image to the smart device 200 by chunked transfer. For example, when the user is outside the field of view of the digital camera 100, the digital camera 100 determines that video data (live image) cannot be generated and sends a dummy image. Thus, data sent from the digital camera 100 to the smart device 200 may include video data generated by the digital camera 100.

Other Exemplary Embodiments

The present disclosure can be further implemented by processing of supplying programs achieving one or more functions of the exemplary embodiments described above to a system or an apparatus via a network or recording medium, reading programs by one or more processors of a computer of the system or apparatus, and executing the programs. Furthermore, the present disclosure can be implemented by a circuit (e.g., ASIC) achieving one or more functions.

Note that the present disclosure is not limited to the exemplary embodiments described above directly and can be embodied by modifying the components for implementation without departing from the scope of the disclosure. In addition, components disclosed in the exemplary embodiments described above are appropriately combined in various forms of the disclosure. For example, some components may be deleted from all the components shown in the exemplary embodiments. Furthermore, components of different exemplary embodiments may be appropriately combined.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-242856, filed Dec. 26, 2018, which is hereby incorporated by reference herein in its entirety.

What is claimed is:

1. A communication apparatus comprising:

an imaging unit;

a communication unit; and a control unit, wherein the control unit generates a live view image by the imaging unit, wherein the control unit receives a first request for continuously acquiring the live view images from an external device, via the communication unit, in a case where the live view image is generated, the control unit sends, as a response to the first request, the live view image generated by the imaging unit to the external device via the communication unit, in a case where the live view image is not generated, the control unit sends, as a response to the first request, an image for notifying that the live view image is not generated to the external device, wherein the control unit receives a second request for acquiring one frame of the live view image, from the external device, via the communication unit, and in a case where the live view image is not generated, the control unit sends, as a response to the second request, data having a header storing information indicating that the live view image is not generated to the external device.

2. The communication apparatus according to claim 1, wherein the control unit sends the live view image generated by the imaging unit to the external device by chunked transfer.

3. The communication apparatus according to claim 1, wherein in the case where the live view image is not generated, the control unit detects a content of an error causing no generation of the live view image, and the control unit puts the detected content of the error in the image for notifying that the live view image is not generated, in a manner such that the detected content of the error is visible to the user.

4. The communication apparatus according to claim 1, wherein the control unit serving as a server in a server-client system communicates with the external device via the communication unit.

5. The communication apparatus according to claim 1, wherein the image for notifying that the live view image is not generated has an aspect ratio and a resolution which are the same as those of the live view image.

6. The communication apparatus according to claim 1, wherein a communication protocol for communication by the communication unit is HTTP.

7. The communication apparatus according to claim 1, further comprising a volatile memory, wherein the case where the live view image is not generated is at least one of a case where parameter setting for the live view image generated by the imaging unit is changed, a case where development processing for the live view image generated by the imaging unit is being performed, and a case where the volatile memory does not have enough capacity to hold the live view image generated by the imaging unit.

8. The communication apparatus according to claim 1, wherein in a case where the live view image is not generated, the control unit sends, as a response to the second request, data having a body further storing information indicating a cause of no generation of the live view image by the imaging unit.

9. A control method for a communication apparatus, the communication apparatus including: an imaging unit; and a communication unit, the method comprising:

generating a live view image by the imaging unit;

receiving a first request for continuously acquiring the live view images from an external device, via the communication unit;

sending, as a response to the request, the live view image generated by the imaging unit, to the external device via the communication unit, in a case where the live view image is generated;

sending, in a case where the live view image is not generated, an image for notifying that the live view image is not generated, to the external device, as a response to the request, receiving a second request for acquiring one frame of the live view image, from the external device, via the communication unit; and sending in a case where the live view image is not generated, as a response to the second request, data having a header storing information indicating that the live view image is not generated to the external device.

10. A non-transitory recording medium recording a program for causing a communication apparatus including an imaging unit and a communication unit to execute a control method, the control method comprising:

generating a live view image by the imaging unit;

receiving a first request for continuously acquiring the live view images from an external device, via the communication unit;

sending, as a response to the request, the live view image generated by the imaging unit, to the external device via the communication unit, in a case where the live view image is generated;

sending, in a case where the live view image is not generated, an image for notifying that the live view image is not generated, to the external device, as a response to the request, receiving a second request for acquiring one frame of the live view image, from the external device, via the communication unit; and sending in a case where the live view image is not generated, as a response to the second request, data having a header storing information indicating that the live view image is not generated to the external device.

11. A communication apparatus comprising:

an imaging unit configured to generate a live view image;

a communication unit; and a control unit, wherein the control unit receives a first request or a second request from an external device via the communication unit, wherein, in a case where the control unit receives the first request from the external device via the communication unit, the control unit repeatedly performs processing of generating a response from the live view image generated by the imaging unit and processing of sending the generated response as a response to the first request to the external device via the communication unit, wherein, in a case where the live view image is not generated by the imaging unit, the control unit performs processing of generating a response from a predetermined image instead of the live view image not generated by the imaging unit and processing of sending the generated response as the response to the first request to the external device via the communication unit, wherein, in a case where the control unit receives the second request from the external device via the communication unit when the live view image is generated by the imaging unit, the control unit performs processing of generating a response from the live view image generated by the imaging unit and processing of sending the generated response as a response to the second request to the external device via the communication unit, and wherein, in a case where the control unit receives the second request from the external device via the communication unit when the live view image is not generated by the imaging unit, the control unit performs processing of generating a response that contains information for notification of occurrence of an error and processing of sending the generated response as the response to the second request to the external device via the communication unit.

12. A control method for a communication apparatus, the communication apparatus including: an imaging unit; and a communication unit, the method comprising:

receiving a first request or a second request from an external device via the communication unit;

repeatedly performing, in a case where the first request is received from the external device via the communication unit, processing of generating a response from a live view image generated by the imaging unit and processing of sending the generated response as a response to the first request to the external device via the communication unit;

performing, in a case where the live view image is not generated by the imaging unit, processing of generating a response from a predetermined image instead of the live view image not generated by the imaging unit and processing of sending the generated response as the response to the first request to the external device via the communication unit;

performing, in a case where the second request is received from the external device via the communication unit when the live view image is generated by the imaging unit, processing of generating a response from the live view image generated by the imaging unit and processing of sending the generated response as a response to the second request to the external device via the communication unit; and performing, in a case where the second request is received from the external device via the communication unit when the live view image is not generated by the imaging unit, processing of generating a response that contains information for notification of occurrence of an error and processing of sending the generated response as the response to the second request to the external device via the communication unit.

13. A non-transitory recording medium recording a program for causing a communication apparatus including an imaging unit and a communication unit to execute a control method, the control method comprising:

receiving a first request or a second request from an external device via the communication unit;

repeatedly performing, in a case where the first request is received from the external device via the communication unit, processing of generating a response from a live view image generated by the imaging unit and processing of sending the generated response as a response to the first request to the external device via the communication unit;

performing, in a case where the live view image is not generated by the imaging unit, processing of generating a response from a predetermined image instead of the live view image not generated by the imaging unit and processing of sending the generated response as the response to the first request to the external device via the communication unit;

performing, in a case where the second request is received from the external device via the communication unit when the live view image is generated by the imaging unit, processing of generating a response from the live view image generated by the imaging unit and processing of sending the generated response as a response to the second request to the external device via the communication unit; and performing, in a case where the second request is received from the external device via the communication unit when the live view image is not generated by the imaging unit, processing of generating a response that contains information for notification of occurrence of an error and processing of sending the generated response as the response to the second request to the external device via the communication unit.

* * * * *